United States Patent [19]

Miyamori

[11] Patent Number: 5,404,481

[45] Date of Patent: Apr. 4, 1995

[54] DMA CONTROLLER COMPRISING BUS SWITCHING MEANS FOR CONNECTING DATA BUS SIGNALS WITH OTHER DATA BUS SIGNALS WITHOUT PROCESS OR INTERVENTION

[75] Inventor: Takashi Miyamori, Tokyo, Japan

[73] Assignee: Kabushiki Kaisha Toshiba, Kawasaki, Japan

[21] Appl. No.: 883,780

[22] Filed: May 15, 1992

[30] Foreign Application Priority Data

May 17, 1991 [JP] Japan .................. 3-113460

[51] Int. Cl.⁶ ............... G06F 12/00; G06F 13/00
[52] U.S. Cl. ................. 395/425; 364/DIG. 1; 364/238.2; 364/240.7; 364/242.31; 364/260; 395/275
[58] Field of Search ........................ 395/425; 364/200 MS File, 900 MS File

[56] References Cited

U.S. PATENT DOCUMENTS

| | | | |
|---|---|---|---|
| 4,271,466 | 6/1981 | Yamamoto et al. | 395/425 |
| 4,467,447 | 8/1984 | Takahashi et al. | 395/250 |
| 4,514,808 | 4/1985 | Murayama et al. | 395/425 |
| 4,604,683 | 8/1986 | Russ et al. | 395/325 |
| 4,716,522 | 12/1987 | Funabashi et al. | 395/250 |
| 4,855,902 | 8/1989 | Kozlik et al. | 395/325 |
| 4,924,427 | 5/1990 | Savage et al. | 395/425 |
| 5,031,097 | 7/1991 | Kitakami et al. | 395/425 |
| 5,210,852 | 5/1993 | Sato | 395/425 |

Primary Examiner—Joseph L. Dixon
Assistant Examiner—Frank J. Asta
Attorney, Agent, or Firm—Oblon, Spivak, McClelland, Maier & Neustadt

[57] ABSTRACT

A DMA controller, has bus switching means for connecting certain data bus signals with other data bus signals by itself during the DMA bus cycle. Therefore, even if the data bus signals in which a memory is connected are different from the data bus signals in which an I/O device is connected, these data bus signals can be connected with each other through said bus switching means, without using an external bus switching device.

18 Claims, 24 Drawing Sheets

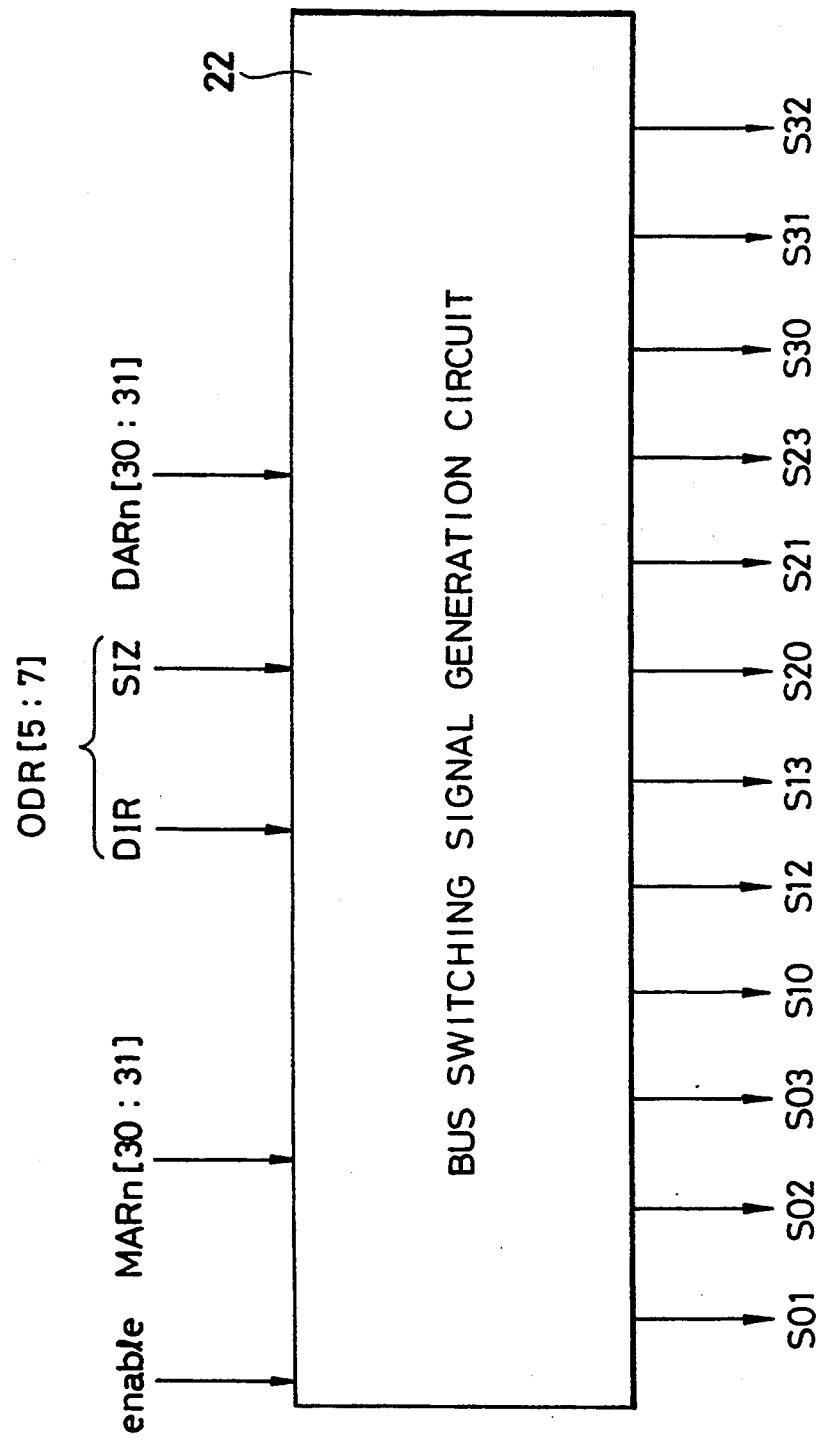

DIR=0 (MEMORY→I/O TRANSFER) SIZ=00(1 BYTE) enable=1

| MAR[30:31] \ DAR[30:31] | 0 0 | 0 1 | 1 0 | 1 1 |
|---|---|---|---|---|
| 0 0 | — | S01 | S02 | S03 |
| 0 1 | S10 | — | S12 | S13 |
| 1 0 | S20 | S21 | — | S23 |
| 1 1 | S30 | S31 | S32 | — |

FIG.6(a)

DIR=1 (I/O→MEMORY TRANSFER) SIZ=00(1 BYTE) enable=1

| MAR[30:31] \ DAR[30:31] | 0 0 | 0 1 | 1 0 | 1 1 |
|---|---|---|---|---|
| 0 0 | — | S10 | S20 | S30 |
| 0 1 | S01 | — | S21 | S31 |
| 1 0 | S02 | S12 | — | S32 |
| 1 1 | S03 | S13 | S23 | — |

DIR=0 (MEMORY→I/O TRANSFER), SIZ=01(2 BYTES), enable=1

| MAR[30:31] \ DAR[30:31] | 0 0 | 1 0 |
|---|---|---|
| 0 0 | — | S02,S13 |
| 1 0 | S20,S31 | — |

FIG. 7(b)

DIR=1 (I/O→MEMORY TRANSFER), SIZ=01(2 BYTES), enable=1

| MAR[30:31] \ DAR[30:31] | 0 0 | 1 0 |
|---|---|---|
| 0 0 | — | S20,S31 |
| 1 0 | S02,S13 | — |

FIG.10

SNG=1, DIR=0, SIZ=00, DAR[30:31]=10

| BUS CYCLE | A00~A29 | BC0#~BC3# | R/W# | D00~D07 | D08~D15 | D16~D23 | D24~D31 | DACKn# | MAR[30:31] | ACTIVE SIGNAL |
|---|---|---|---|---|---|---|---|---|---|---|
| ① MEMORY READ | 4n | 0111 | 1 | A | — | (A) | — | 0 | 00 | S02 |
| ② MEMORY READ | 4n | 1011 | 1 | — | B | (B) | — | 0 | 01 | S12 |
| ③ MEMORY READ | 4n | 1101 | 1 | — | — | C | — | 0 | 10 | — |
| ④ MEMORY READ | 4n | 1110 | 1 | — | — | (D) | D | 0 | 11 | S32 |

SNG=0(DUAL ADDRESS TRANSFER), DIR=0(MEMORY→I/O TRANSFER), SIZ=00(1 BYTE), R/W#=0(I/O WRITE BUS CYCLE)

| MAR[30:31] \ DAR[30:31] | 0 0 | 0 1 | 1 0 | 1 1 |
|---|---|---|---|---|
| 0 0 | S00W | S00W,S01 | S00W,S02 | S00W,S03 |
| 0 1 | S11W,S10 | S11W | S11W,S12 | S11W,S13 |
| 1 0 | S22W,S20 | S22W,S21 | S22W | S22W,S23 |
| 1 1 | S33W,S30 | S33W,S31 | S33W,S32 | S33W |

FIG.15(a)

SNG=0(DUAL ADDRESS TRANSFER), DIR=1(I/O→MEMORY TRANSFER), SIZ=00(1 BYTE), R/W#=1(I/O READ BUS CYCLE)

| MAR[30:31] \ DAR[30:31] | 0 0 | 0 1 | 1 0 | 1 1 |
|---|---|---|---|---|
| 0 0 | S00R | S00R,S10 | S00R,S20 | S00R,S30 |
| 0 1 | S11R,S01 | S11R | S11R,S21 | S11R,S31 |
| 1 0 | S22R,S02 | S22R,S12 | S22R | S22R,S32 |
| 1 1 | S33R,S03 | S33R,S13 | S33R,S23 | S33R |

FIG.15(b)

SNG=0(DUAL ADDRESS TRANSFER),DIR=0(MEMORY→I/O TRANSFER),
SIZ=01(2 BYTES),R/W#=0(I/O WRITE BUS CYCLE)

| MAR[30:31] \ DAR[30:31] | 0 0 | 1 0 |
|---|---|---|
| 0 0 | S00W,S11W | S00W,S02,S11W,S13 |
| 1 0 | S22W,S20,S33W,S31 | S22W,S33W |

FIG.16(a)

SNG=0(DUAL ADDRESS TRANSFER),DIR=1(I/O→MEMORY TRANSFER),
SIZ=01(2 BYTES),R/W#=1(I/O READ BUS CYCLE)

| MAR[30:31] \ DAR[30:31] | 0 0 | 1 0 |
|---|---|---|
| 0 0 | S00R,S11R | S00R,S20,S11R,S31 |
| 1 0 | S22R,S02,S33R,S13 | S22R,S33R |

SNG=0(DUAL ADDRESS TRANSFER), DIR=0(MEMORY→I/O TRANSFER), SIZ=10(4 BYTES), R/W#=0(I/O WRITE BUS CYCLE)

| MAR[30:31] \ DAR[30:31] | 0 0 |
|---|---|
| 0 0 | S00W, S11W, S22W, S33W |

FIG. 17(b)

SNG=0(DUAL ADDRESS TRANSFER), DIR=1(I/O→MEMORY TRANSFER), SIZ=10(4 BYTES), R/W#=1(I/O READ BUS CYCLE)

| MAR[30:31] \ DAR[30:31] | 0 0 |
|---|---|
| 0 0 | S00R, S11R, S22R, S33R |

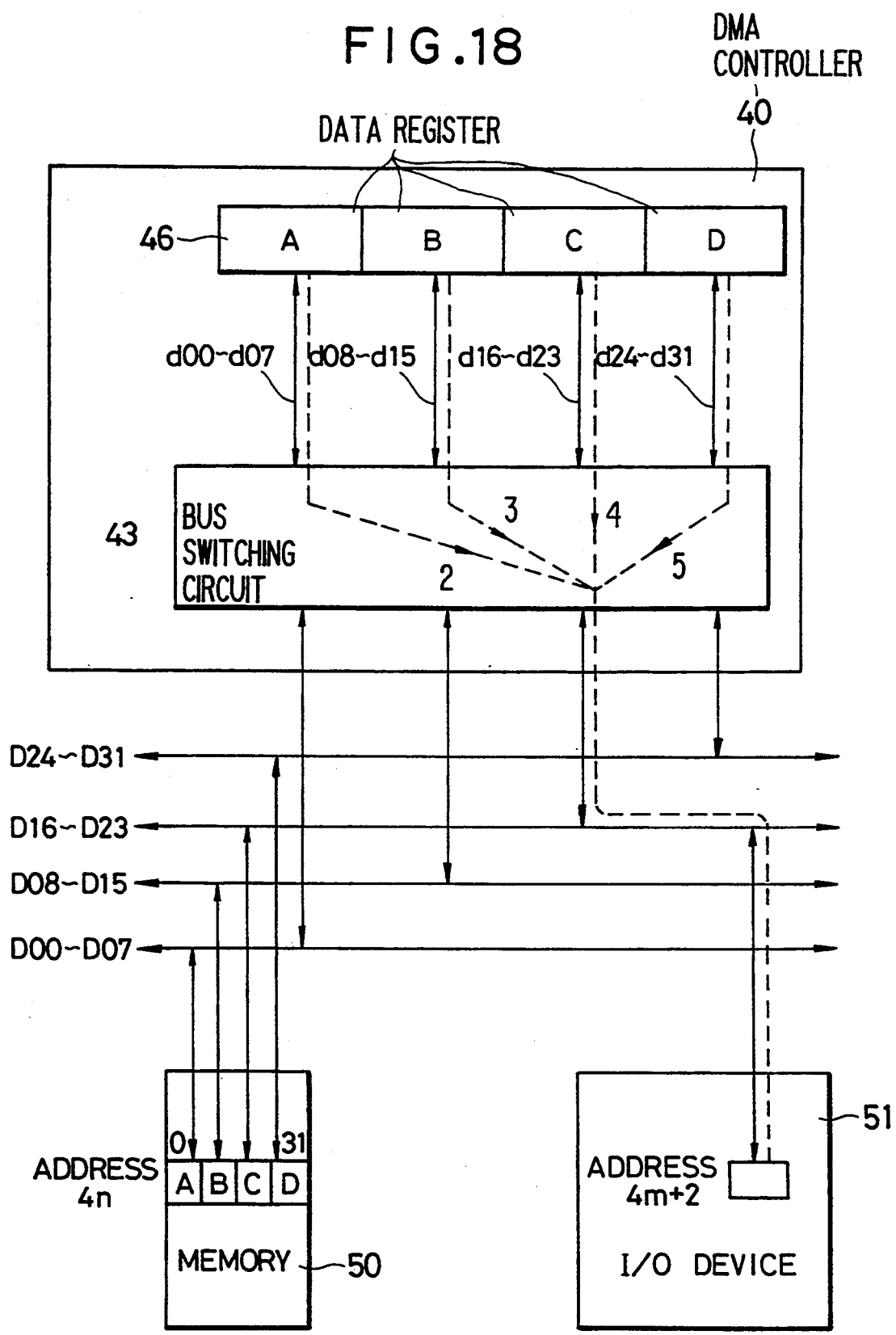

FIG.19

SNG=0, DIR=0, SIZ=0, DAR[30:31]=10

| BUS CYCLE | A00~A29 | BC0#~BC3# | R/W# | D00~D07 | D08~D15 | D16~D23 | D24~D31 | DACKn# | MAR[30:31] | ACTIVE SIGNAL |
|---|---|---|---|---|---|---|---|---|---|---|
| 1 I/O WRITE | 4n | 0000 | 1 | A | B | C | D | 1 | 00 | S00R,S11R S22R,S33R |
| 2 I/O WRITE | 4m | 1101 | 0 | – | – | A | – | 0 | 00 | S00R,S02 |
| 3 I/O WRITE | 4m | 1101 | 0 | – | – | B | – | 0 | 01 | S11W,S12 |
| 4 I/O WRITE | 4m | 1101 | 0 | – | – | C | – | 0 | 10 | S22W |
| 5 I/O WRITE | 4m | 1101 | 0 | – | – | D | – | 0 | 11 | S33W,S32 |

FIG. 22(a)

SIZ=00 (1 BYTE), enable=1

| MAR[30:31] \ DAR[30:31] | 0 0 | 0 1 | 1 0 | 1 1 |
|---|---|---|---|---|
| 0 0 | — | BS01 | BS02 | BS03 |
| 0 1 | BS01 | — | BS12 | BS13 |
| 1 0 | BS02 | BS12 | — | BS23 |
| 1 1 | BS03 | BS13 | BS23 | — |

FIG. 22(b)

SIZ=01 (2 BYTES), enable=1

| MAR[30:31] \ DAR[30:31] | 0 0 | 1 0 |
|---|---|---|
| 0 0 | — | BS02, BS13 |
| 1 0 | BS02, BS13 | — |

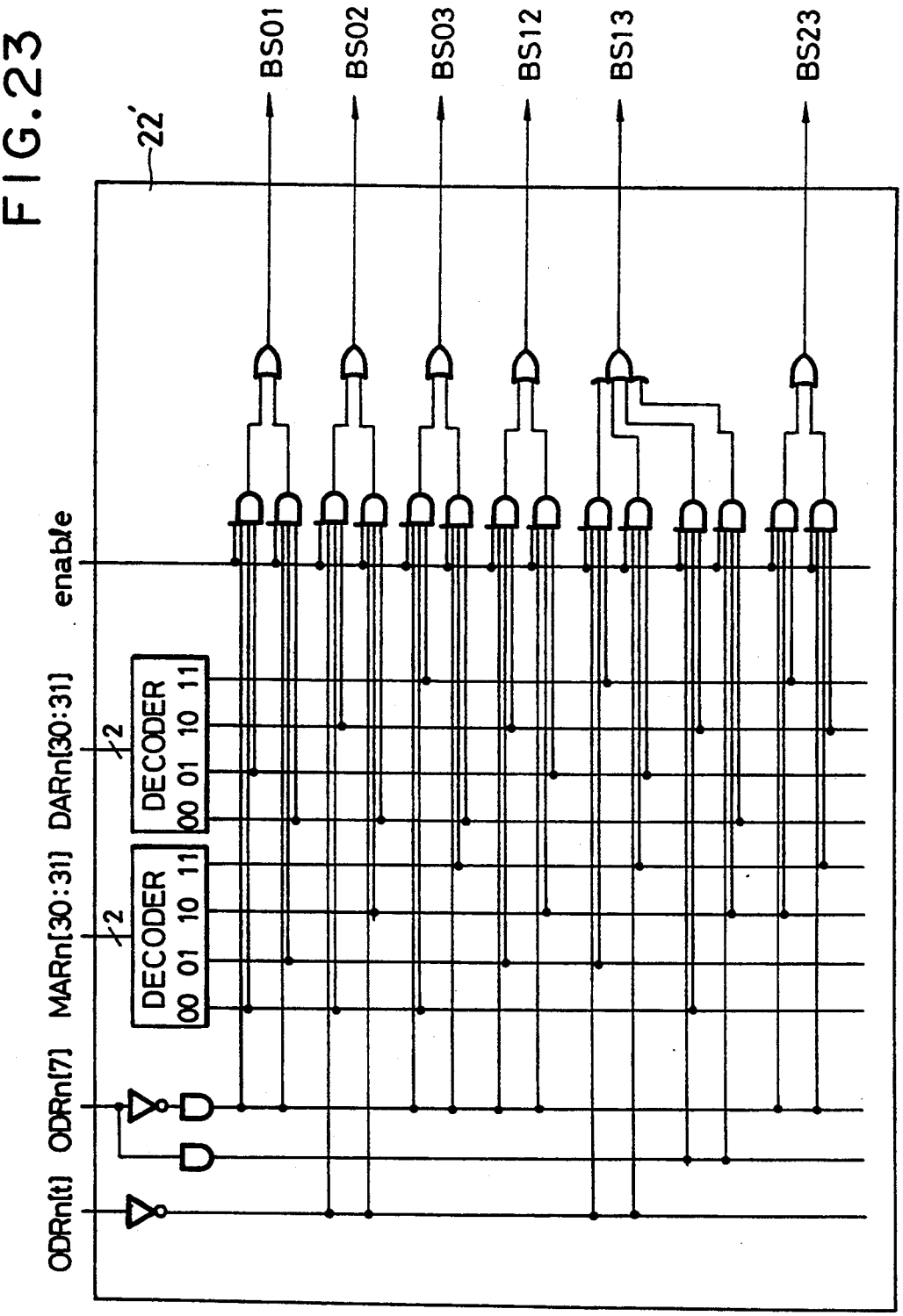

DMA CONTROLLER COMPRISING BUS SWITCHING MEANS FOR CONNECTING DATA BUS SIGNALS WITH OTHER DATA BUS SIGNALS WITHOUT PROCESS OR INTERVENTION

BACKGROUND OF THE INVENTION

1. Field of the invention

This invention relates to a DMA controller which executes a data transfer between an external I/O device and a memory instead of a processor. In particular, this invention relates to a DMA controller which has a function to carry out a data transfer between an external I/O device and a memory within one bus cycle.

2. Description of the prior arts

Once a DMA transfer request occurs inside or outside a DMA controller, the controller acquires a bus mastership from a processor, and then, executes a data transfer between a memory and an I/O device instead of said processor.

In general, there are two processes to carry out a data transfer. One of them is to execute a memory bus cycle and an I/O bus cycle separately. This process is called a dual address transfer because memory addresses are output during memory bus cycles and I/O addresses are output during I/O bus cycles respectively. In this dual address transfer mode, data should be once stored into data registers which are placed inside the DMA controller, in order to execute a data transfer between the memory and the I/O device.

In another process, the DMA controller executes only memory bus cycles and transfers data directly between the memory and the I/O device through data buses. This process is called a single address transfer, because the DMA controller outputs only memory addresses. In this process, the access to an I/O device is executed by a DMA transfer acknowledge signal which is active during a DMA data transfer cycle. One example of a single address transfer system is shown in FIG. 24.

In the case shown in FIG. 24, the port sizes of memory 120 and I/O device 114 are different with each other. The port size of memory 120 is two bytes, and the upper byte memory 112 is connected with the upper bytes of the data bus, while the lower byte memory 113 is connected with the lower bytes of the data bus. For example, an I/O device having one byte port size is connected with a processor system having a 16 bit data bus. The port size of I/O device 114 is one byte, and this device is connected with the lower part of the data bus. When a DMA transfer request occurs, DMA controller 111 activates a bus request signal, and requires a bus mastership against processor 110. Once a bus acknowledge signal is activated by processor 110, and so, the bus mastership is given to DMA controller 111, a DMA transfer starts.

Next, an operation, in which data are transferred from memory 120 to I/O device 114 in a single address transfer mode, will be described. First, DMA controller 111 executes a bus cycle (memory read cycle) to read out data from memory 120. At this aim, DMA controller 111 outputs the address of memory 120 into the address bus, and then, outputs control signals into the control bus for a memory read operation. During this bus cycle, the DMA transfer acknowledge signal for I/O device 114 is activated. Because the port size of I/O device 114 is one byte, the bus cycle taken by DMA controller 111 becomes one byte size access. In a memory read cycle for upper bytes, upper byte memory 112 outputs data into the upper bytes of the data bus. In FIG. 24, I/O device 114 is connected with the lower bytes of the data bus. Therefore, DMA controller 111 activates the bus switching signal in order to connect the upper bytes with the lower bytes of the data bus by means of bus switching device 115. As a result, the output data from upper byte memory 112 can be output into the lower bytes of the data bus. During this memory read cycle, I/O device 114 reads the data in the lower bytes of the data bus, using the DMA transfer response signal and the control signal.

As described in said prior art, if the port size of memory 120 is different from that of I/O device 114 in a single address transfer mode, bus switching device 115 should be provided outside the controller. Accordingly, DMA controller 111 must output bus switching signals. In the Japanese Patent Publications NOs. Sho 58-46727 and Hei 1-20781, examples of the above mentioned prior art are described.

The device, which is disclosed in the Patent Publication NO. Sho 58-46727, provides a signal to indicate whether the size of a DMA data transfer is one byte or two bytes and another signal to indicate whether it is an upper byte transfer or lower byte transfer of one byte size, as bus switching signals. In this case, an I/O device of one byte size should be connected with the lower bytes. On the other hand, in the device disclosed in the Patent Publication NO. Hei 1-20781, a signal, which becomes active when a DMA data transfer is one byte size and also it is an upper byte transfer, as a bus switching signal.

In said single address transfer systems of the prior arts, an external switching device is required as mentioned above. In addition, the DMA controller should output bus switching signals. Moreover, the connection point of an I/O device may be fixed due to the bus switching signal, thus causing a physical restriction for the structure of a microprocessor system. In some systems, each having a wide data bus, such as a 32 bit (4-byte) or 64 bit (8-byte) data bus, I/O devices having different port sizes with each other, such as one byte, two bytes, and 4 bytes, are mixed. In such systems, lots of bus switching signals and bus switching devices are required, thus causing a difficulty for designing a microprocessor systems.

SUMMARY OF THE INVENTION

This invention has been made to overcome the above mentioned problems of the prior arts.

Therefore, the objective of the present invention is to provide a DMA controller which do not require to have an external bus switching devices and DMA bus switching signals.

Another objective of the present invention is to provide a DMA controller which facilitates the construction of a micro-processor system.

Still another objective of the present invention is to provide a DMA controller which is capable of performing bus switchings by itself between a memory and an I/O device.

The first feature of the present invention is to provide a DMA controller for controlling DMA transfers on a data bus comprised of a plurality of data bus signals, the DMA controller which has bus switching means 1 for connecting certain data bus signals with different data bus signals during the DMA bus cycle, as shown in FIG. 1.

The second feature of the present invention is to provide a DMA controller for controlling DMA transfers on a data bus comprised of plural-byte data bus signals, the DMA controller which is comprised the following as shown in FIG. 1: first address means 3 for indicating the position of certain data bus signals on said data bus with byte unit; direction indicating means 5 for specifying whether the content in said address means 3 is the source address or the destination address; size indicating means 6 for specifying the size of an access; bus switching signal generation means 2 for producing bus switching signals which indicate to connect certain data bus signals with different data bus signals, according to the content in said first address means 3, direction indicating means 5, and size indicating means 6; and bus switching means 1 for connecting certain data bus signals with other data bus signals according to said bus switching signals.

The third feature of the present invention is to provide a DMA controller for controlling DMA transfers on a data bus comprised of plural-byte of data bus signals, the DMA controller which is comprised the following as shown in FIG. 1: first address means 3 for indicating the position of certain data bus signals on said data bus with byte unit; second address means 4 for indicating the position of other data bus signals on said data bus with byte unit; direction indicating means 5 for specifying whether the content in either one of said first address means 3 or second address means 4 is the source address or the destination address; size indicating means 6 for specifying the size of an access; bus switching signal generation means 2 for producing bus switching signals which indicate to connect certain data bus signals with different data bus signals, according to the content in said first address means 3, second address means 4, direction indicating means 5, and size indicating means 6; and bus switching means 1 for connecting certain data bus signals with other data bus signals according to said bus switching signals.

In a DMA controller according to said second and third features of the present invention, bus switching signals for connecting certain data bus signals with other data bus signals are produced in bus switching signal generation circuit 2 according to the informations described below, in order to control DMA transfers on a data bus which is comprised of plural-byte bus signals. That is: the position of certain data bus signals on said data bus in byte unit, the position which is indicted by said first address means 3; the position of other data bus signals on said data bus with byte unit, the position which is indicated by said second address means 4; the direction of said first and second address means 3 and 4, the direction which are indicated by the direction indicating means 5; and the access size which is indicated by size indicating means 6.

Accordingly, in a single address transfer mode, even if the data bus signals connected with a memory, are different from the data bus signals connected with an I/O device, bus switching signal generation means 2 control bus switching means 1 so as to connect between said different data bus signals. So, the DMA controller of this invention do not require to have external bus switching devices and DMA bus switching signals, which have been required in prior art DMA controllers. The DMA controller of this invention, therefore, facilitates the construction of a micro-processor system.

Further, in the DMA controller of this invention, the connection point of an I/O device is specified by the first and second address means 3 and 4, and the port size of the I/O device is specified by the size indicating means 6, in the DMA controller of this invention. Therefore, connections of I/O devices are not restricted unlike the prior art device, thus enabling to construct a microprocessor system more flexibly.

These and other objectives, features, and advantages of the present invention will be more apparent from the following detailed description of preferred embodiments in conjunction with the accompanying drawings.

BRIEF DESCRIPTION OF THE DRAWINGS

FIG. 5 is a view explaining the interface signals for a bus switching signal generation circuit according to the first embodiment of this invention;

FIG. 6a shows bus switching signals SXX which are activated when DIR bit is 0 (a transfer from a memory to an I/O device) and SIZ bit is 00 (the port size of the I/O device is one byte);

FIG. 6b shows bus switching signals SXX which are activated when DIR bit is 1 (a transfer from the I/O device to the memory) and SIZ bit is 00;

FIG. 7a shows bus switching signals SXX which are activated when DIR bit is 0 (a transfer from the memory to the I/O device) and SIZ bit is 01 (the port size of the I/O device is 2 bytes);

FIG. 7b shows bus switching signals SXX which are activated when DIR bit is 1 (a transfer from the I/O device to the memory) and SIZ bit is 01;

FIG. 10 illustrates outputs signals during the first, second, third, and fourth bus cycles of the DMA transfer shown in FIG. 9;

FIG. 15a shows bus switching signals which are activated when it is a transfer from a memory to an I/O device (DIR=0) in a dual address transfer mode (SNG=0) and when the port size of the I/O device is one byte (SIZ=00) in an I/O write bus cycle (R/W#=0);

FIG. 15b shows bus switching signals which are activated when it is a transfer from the I/O device to the memory (DIR=1) in a dual address transfer mode and when the port size of the I/O device is one byte in an I/O read bus cycle (R/W#=1);

FIG. 16a shows bus switching signals which are activated when it is a transfer from the memory to the I/O device (DIR=0) in a dual address transfer mode (SNG=0) and when the port size of the I/O device is 2 bytes (SIZ=01) in an I/O write bus cycle (R/W#=0);

FIG. 16b shows bus switching signals which are activated when it is a transfer from the I/O device to the memory (DIR=1) in a dual address transfer mode (SNG=0) and when the port size of the I/O device is 2 bytes (SIZ=01) in an I/O read bus cycle (R/W#=1);

FIG. 17a shows bus switching signals which are activated when it is a transfer from the memory to the I/O device (DIR=0) in a dual address transfer mode (SNG=0) and when the port size of the I/O device is 4 bytes (SIZ=10) in an I/O write bus cycle (R/W#=0);

FIG. 17b shows bus switching signals which are activated when it is a transfer from the I/O device to the memory (DIR=1) in a dual address transfer mode (SNG=0) and when the port size of the I/O device is 4 bytes in an I/O read bus cycle (R/W#=1);

FIG. 18 is a view explaining the DMA transfer operation from memory address (4n+0) to the I/O device in address (4m+2) according to the second embodiment of the present invention;

FIG. 19 shows output signals obtained in the period from the first to fifth bus cycles of the DMA transfer shown in FIG. 18;

FIG. 22a shows bus switching signals which are made active when SIZ bit is 00 (the port size of an I/O device is one byte);

FIG. 22b shows bus switching signals which are made active when SIZ bit is 01 (the port size of the I/O device is 2 bytes);

FIG. 23 is a schematic diagram showing the bus switching signal generation circuit according to the third embodiment of the present invention.

DETAILED DESCRIPTION OF THE EMBODIMENTS

Preferred embodiments of the present invention will be described below with referring to figures.

Figure 1:
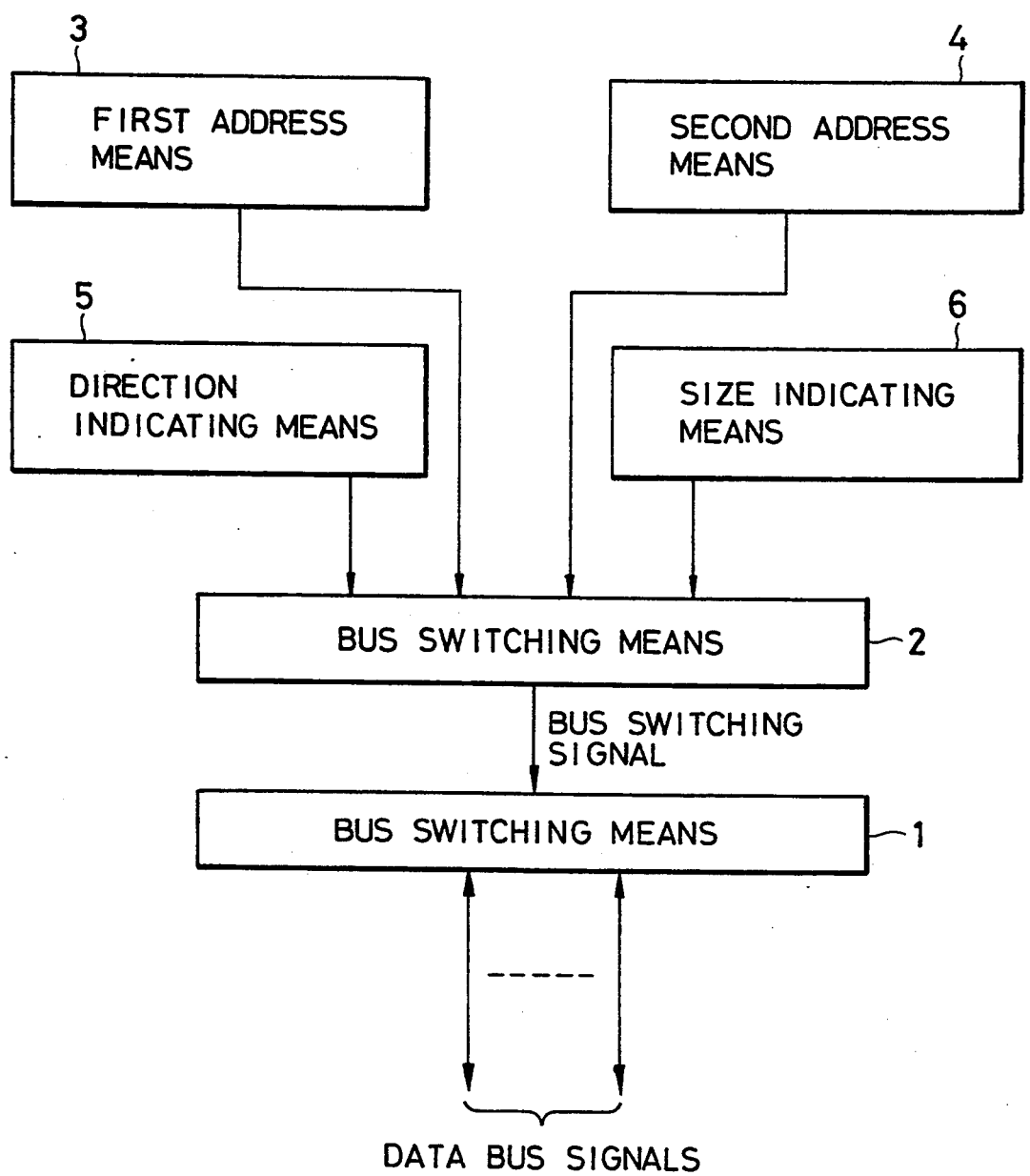
FIG. 1 is a block diagram showing the principle of the present invention.
Figure 2:
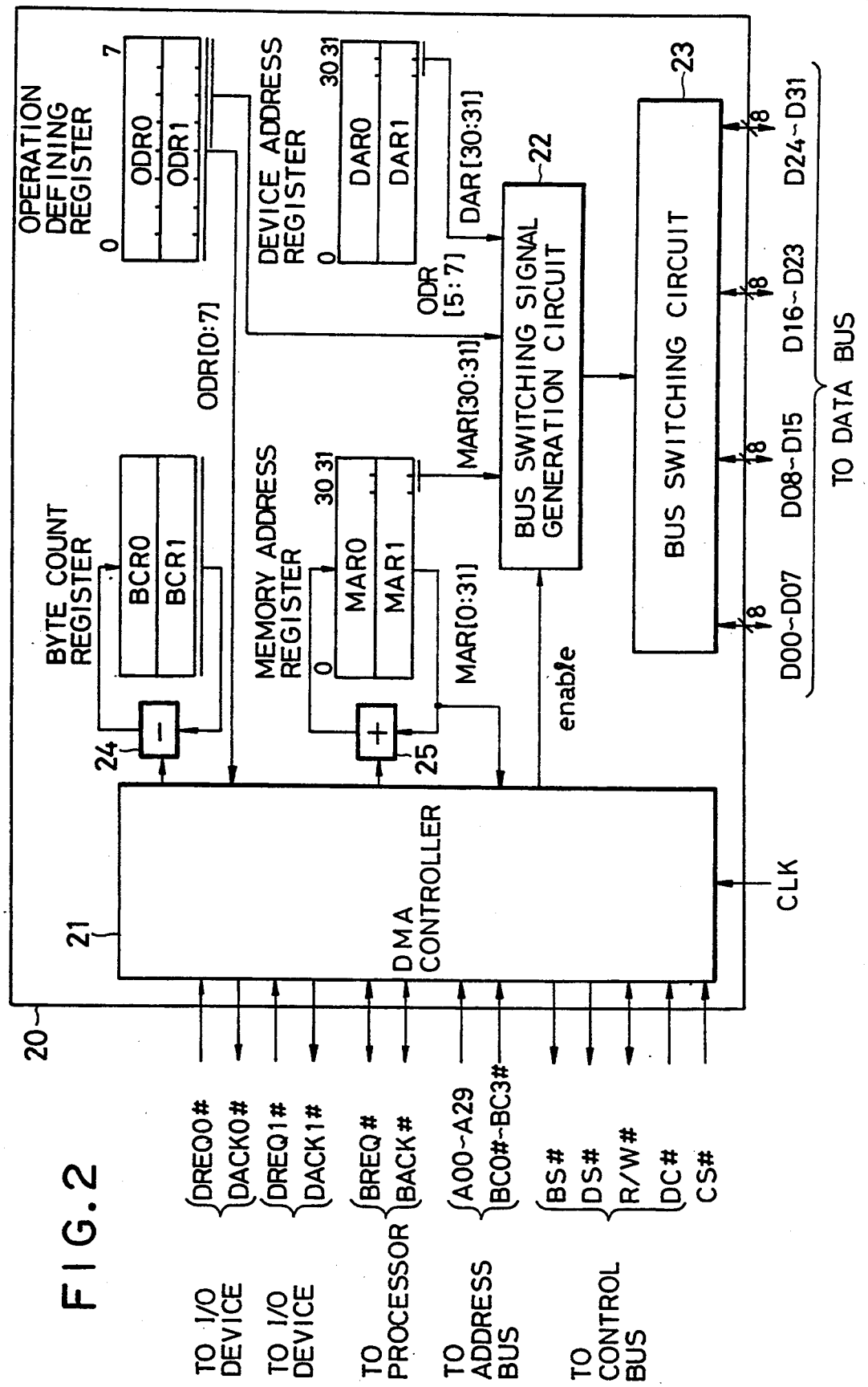
FIG. 2 is a block diagram showing the structure of a DMA controller according to the first embodiment of this invention.

FIG. 2 is a schematic diagram showing the structure of a DMA controller according to the first embodiment of this invention.

As shown in FIG. 2, a DMA controller 20 is comprised of a DMA control circuit 21, a bus switching signal generation circuit 22, a bus switching circuit 23, a subtracter 24, and an adder 25. This controller 20 is developed to control a two channel DMA transfer. Accordingly, controller 20 has the following internal registers corresponding to each channel: operation defining registers 0DR0 and 0DR1; memory address registers MAR0 and MAR1; device address registers DAR0 and DAR1; and byte count registers BCR0 and BCR1. These internal registers are read and written by an external processor.

The following external signals are supplied to DMA controller 20. DMA transfer request signal DREQ0# is a signal from an external I/O device and DMA transfer request signal DREQ#1 is a signal from another external I/O device. These signals were to request a DMA transfer. Each external I/O device makes said respective signal active to request a DMA transfer of controller 20.

DMA transfer acknowledge signal DACK0# shows that a DMA transfer is performed according to the transfer request from the first external I/O device. On the other hand, DMA transfer acknowledge signal DACK1# shows that a DMA transfer is performed according to the transfer request from the second external I/O device. In a single address transfer mode, respective I/O devices are accessed with these signals.

Bus request signal BREQ# requires to have a bus control of the processor. On the other hand, bus acknowledge signal BACK# responds to the bus mastership request made by bus control request signal BREQ#. When signal BACK# is active, DMA controller 20 becomes a bus master and begins to execute a DMA transfer cycle.

Address bus signals A00 to A29 indicate the upper 30 bits of an DMA transfer address. On the other hand, byte control signals BC0#–BC3# indicate valid bytes among data bus signals D00–D31. In this embodiment, the width of data bus signals D00–D31 is 32 bits (4 bytes). Accordingly, four signals BC0#–BC3# are provided as byte control signals. Byte control signal BC0# shows that data bus signals D00–D07 are valid. Similarly, respective byte control signals BC1#, BC2#, and BC3# show that corresponding data bus signals D08–D15, D16–D23, and D24–D31 are valid. Address bus signals A00–A29 and byte control signals BC0#–BC3# are connected with the address bus.

Data bus signals D00–D31 are provided in order to exchange data with I/O devices and memories. These signals are connected with the data bus.

Bus start signal BS# indicates the beginning of a bus cycle. This signal becomes active only for the first clock of the bus cycle.

Data strobe signal DS# indicates the validity of data. This signal is active during the period from the next clock of the beginning to the end of the bus cycle.

Read write signal R/W# shows whether the bus cycle is a read bus cycle or a write bus cycle. This signal is set 1 (high level) in a read bus cycle, while it is set 0 (low level) in a write bus cycle.

Data transfer complete signal DC# shows the end of the bus cycle. When this signal is set active by external devices, such as memories and I/O devices, DMA controller 20 completes the bus cycle.

Chip select signal CS# is set active from outside when the processor accesses the registers in DMA controller 20. At this time, a part of address bus signals A00–A29, byte control signals BC0#–BC3#, and read write signal R/W# become input signals.

Figure 3:
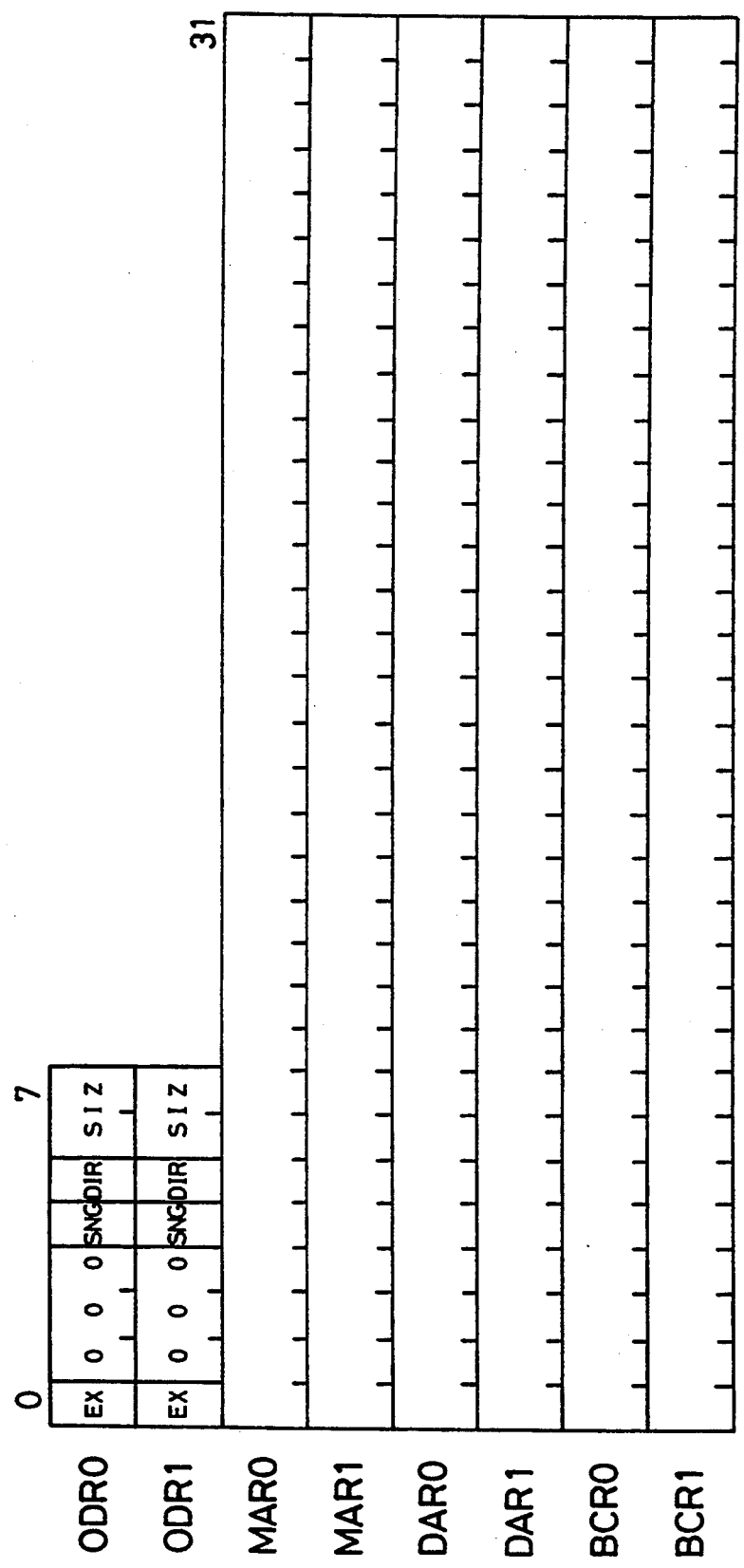
FIG. 3 is a view showing the structures of internal registers included in a DMA controller of this invention.

The internal registers of DMA controller 20 will be explained next. In FIG. 3, the structures of these internal registers are shown.

Operation defining registers 0DRn (n=0, 1) define the operation of a DMA transfer. Ex bit in the figure shows whether the channel n is under operation or not. When this bit is set 1, it means channel n is under operation. Accordingly, a DMA transfer is performed in this situation, if DMA transfer request signal DREQ# is set active from an external I/O device. On the other hand, when the bit is set 0, a DMA transfer is not performed. SNG bit designates the operation in a single address transfer mode when it is set 1, while it designates the operation in a dual address transfer mode when it is set 0. In the embodiment shown in FIG. 2, this bit is fixed to 1, because only a single address transfer mode is allowed. DIR bit shows the direction of a transfer. When this bit is set 0, a transfer from a memory to an I/O device is performed. By contrast, when the bit is set 1, a transfer from the I/O device to the memory is performed. SIZ bit designates the size of I/O devices. When this bit is set 00, it means the size of an I/O device is one byte. Similarly, 01 shows two bytes, and 10 shows four bytes respectively. When the bit is set 11, it means no operation is not guaranteed.

Memory address registers MARn (n=0, 1) store addresses of memories which are accessed in DMA transfers. The upper 30 bit values of the respective register are output into address bus signals A00–A29, during memory access cycles of a dual address transfer, as well as bus cycles of a single address transfer. Memory address registers MARn increase their values in every DMA transfer by the transferred amount of bytes.

Device address registers DARn (n=0, 1) store device addresses which are accessed in DMA transfers. The upper 30 bit values of the respective registers DARn are output into address bus signals A00–A29 during an I/O access cycle of a dual address transfer. On the other hand, in a single address transfer mode, the upper 30 bit values of the respective registers DARn do not have any meanings, because I/O device addresses are not supplied into address bus signals A00–A29. According to the lower two bit values of device address register DARn and SIZ bit value of operation defining register ODRn, the connecting point of an I/O device on the data bus can be specified. For example, the I/O device is connected with the data bus signals D00–D07 in the following conditions: SIZ bit is set 00 (the port size of the I/O device is one byte); and the lower 2 bits of the device address register DARn is set 00. Similarly, in the case where SIZ bit is set 00, that is, the port size of the I/O device is one byte, the I/O device is connected with data bus signals D08–D15 when the lower 2 bits of the device address register DARn is set 01; data bus signals D16–D23 when the lower 2 bits of said register is set 10; and data bus signals D24–D31 when the lower 2 bits of said register is set 11. On the other hand, in the case where SIZ bit is set 01, that is, the port size of the I/O device is 2 bytes, the I/O device is connected with data bus signals D00–D15 when the lower 2 bits of the device address register DARn is set 00; and data bus signals D16–D21 when the lower 2 bites of said register is set 10. In addition, when SIZ bit is set 10, that is, the port size of the I/O device is 4 byte, only 00 can be set to be the lower 2 bit values of device address register DARn. In this case, the I/O device is connected with data bus signals D00–D31.

Byte count registers BCRn (n=0, 1) show the byte numbers of data to be transferred. In every DMA transfer, the register reduces its values by the transferred amount of bytes. When the value of the register comes into 0, the DMA transfer is completed.

The respective structure elements shown in FIG. 2 will be explained next.

DMA transfer circuit 21 controls a DMA transfer. This circuit 21 is connected with external processors, I/O devices, and memories by means of external signals other than data bus signals. Through these signals, circuit 21 controls the exchange of a bus mastership with a processor using bus request signal BREQ# and bus acknowledge signal BACK#, and also controls the execution of a bus cycle for a DMA transfer, which is required by an I/O device through DMA transfer request signals DREQn#. This circuit 21 is also connected with each internal register to control inside operations. In order to update memory address registers MARn and byte count registers BCRn in every DMA transfer, circuit 21 is connected with adder 25 and subtracter 24 respectively. In addition, through an enable signal which stays active during a single address transfer, circuit 21 is further connected with bus switching signal generation circuit 22.

Figure 4:
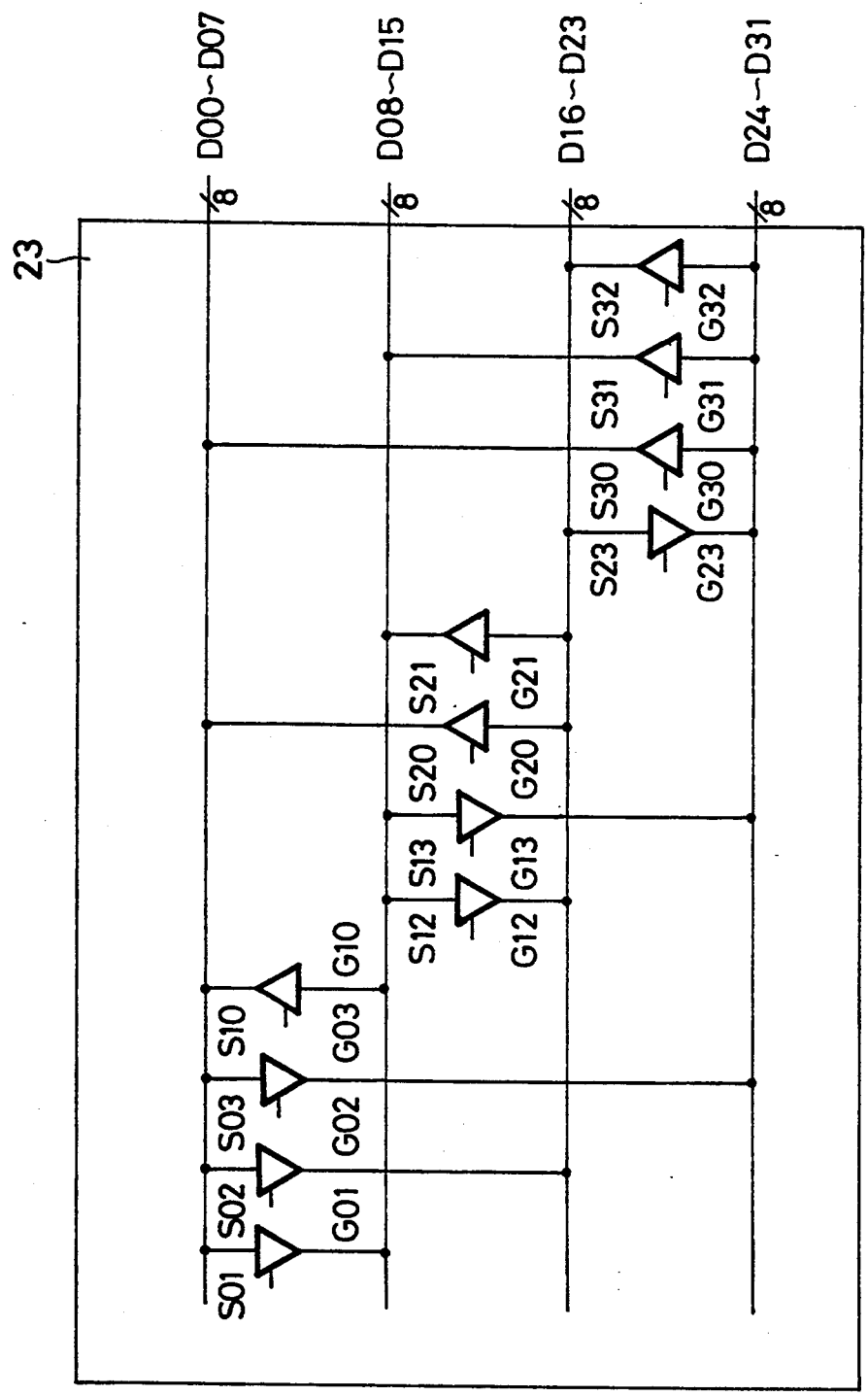
FIG. 4 is a schematic diagram showing the detailed structure of a bus switching circuit according to the first embodiment of this invention.

Bus switching circuit 23 controls the switching of data bus signals D00–D31 using signals from bus switching signal generation circuit 22. In FIG. 4, the details of circuit 23 is shown. Gate G01 in the figure is used to transmit data bus signals D00–D07 into data bus signals D08–D15. This gate G01 becomes conductive when bus switching signal S01 from bus switching signal generation circuit 22 is active. Similarly, gate G02 is provided in order to transmit data bus signals D00–D17 to data bus signals D16–D23; G03 is to transmit data bus signals D00–D07 to signals D24–D31; G10 is to transmit data bus signals D08–D15 to signals D00–D07; G12 is to transmit data bus signals D08–D15 to signals D16–D23; G13 is to transmit data bus signals D08–D15 to signals D24–D31; G20 is to transmit data bus signals D16–D23 to D00–D07; G21 is to transmit data bus signals D16–D23 to signals D08–D15; G23 is to transmit data bus signals D16–D23 to signals D24–D31; G30 is to transmit data bus signals D24–D31 to signals D00–D07; G31 is to transmit data bus signals D24–D31 to signals D08–D15; and G32 is to transmit data bus signals D24–D31 to signals D16–D23. Signals S01, S02, S03, S10, S12, S13, S20, S21, S23, S30, S31, and S32 indicate bus switching signals, each of which makes the corresponding gate (G01, G02, G03, G10, G12, G13, G20, G21, G23, G30, G31, G32) conductive.

Bus switching signal generation circuit 22 produces said bus switching signals SXX corresponding to said gate group in bus switching circuit 23. Interface signals for bus switching signal generation circuit 22 are shown in FIG. 5. The enable signal from DMA control circuit 21, the lower 2 bites, MAR [30 : 31], from memory address register MARn, the outputs from DIR bit and SIZ bit contained in operation defining register ODRn, and the lower 2 bites, DAR [30 : 31], of device address register DARn, are input to circuit 22. According to these inputs, circuit 22 generates bus switching signals and outputs them into said gates in bus switching circuit 23.

FIGS. 6a, 6b, 7a, and 7b explain the conditions which are required to generate said bus switching signals. FIG. 6a shows bus switching signals SXX which are made active when DIR bit is 0, (that is, a transfer from the memory to the I/O device), and SIZ bit is 00, (that is, the port size of the I/O device is one byte). For example, it is clear from the table shown in FIG. 6a that bus switching signal S21 becomes active when DAR [30 : 31] is 01 and MAR [30 : 31] is 10. The operation of this case is as follows. That is, a data transfer is executed from the memory to the I/O device in this case. Therefore, a read bus cycle of the memory is performed. In other words, data bus signals D16–D23 are output because MAR [30 : 31] is 10. On the other hand, the I/O device is connected with data bus signals D08–D15, because DAR [30 : 31] is 01. In a single address transfer mode, data are written into the I/O device during this read bus cycle. Accordingly, data signals D16–D23 should be output to data bus signals D08–D15. Bus switching signal S21 is, therefore, made active to cause gate S21 to conduct.

Similarly, FIG. 6b shows bus switching signals SXX which are made active when DIR bit is 1, (that is, a transfer from the I/O device to the memory), and SIZ bit is 00, (that is, the port size of the I/O device is one byte). FIG. 7a shows bus switching signals SXX which are made active when DIR bit is 0, (a transfer from the memory to the I/O device), and SIZ bit is 01, (the port size of the I/O device is 2 bytes). On the other hand, FIG. 7b shows bus switching signals SXX which are made active when DIR bit is 1, (a transfer from the I/O device to the memory), and SIZ bit is 01, (the port size of the I/O device is 2 bytes). These output signals become active when the enable signal is set active (1). By contrast, these output signals do not become active when SIZ bit is 10, that is, the port size of the I/O device is 4 bytes.

Bus switching signal generation circuit 22 is comprised of AND, OR, and NOT gates or the like which are so combined that the above mentioned logic is realized. Any circuit elements, such as a PLA and a ROM can be used to realize said logic.

Figure 8:
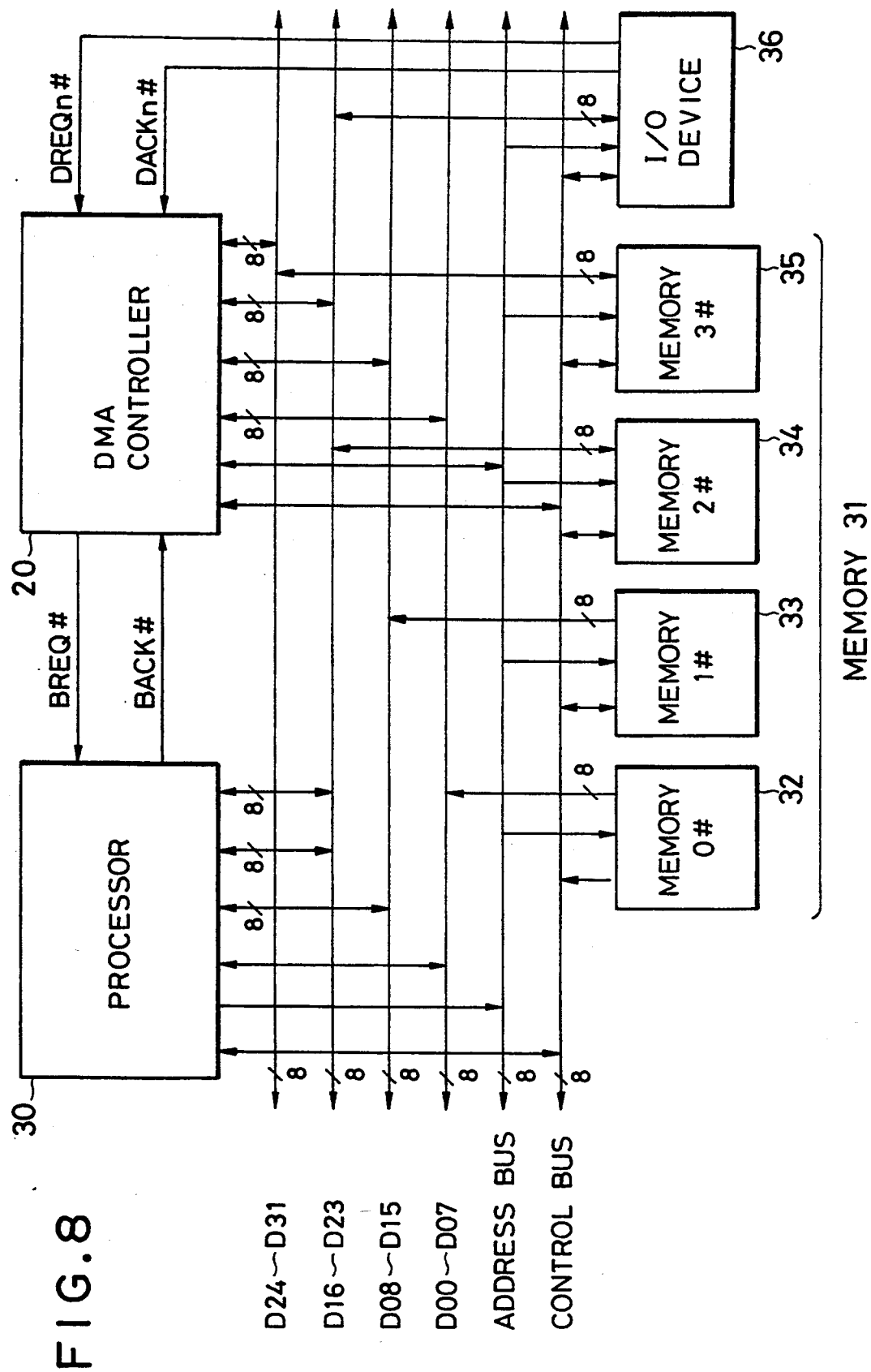
FIG. 8 is a schematic diagram showing the structure of a micro-processor system having an 8 bit I/O device which is connected with a DMA controller and data bus signals D16–D23.

A micro-processor system using DMA controller 20 according to the present embodiment will be described next. FIG. 8 shows the structure of a system having DMA controller 20 and 8 bit I/O device 36 which is connected with data bus signals D16–D23.

First, the internal registers of DMA controller 20 are initialized by processor 30. In memory address registers MARn, the numbers of bytes, which indicate the range of transfer areas, are set. In device address register DARn, the address in which I/O device 36 is connected with should be set. In this case, I/O device 36 is connected with data bus signals D16–D23, therefore, the lower 2 bites of the register is set 10. It is not necessary to set the upper 30 bits of the register. At the last stage, EX bit of operation defining register 0DRn is set 1, in order to start the operation. Then, SNG bit is set 1 in order to set a single address transfer mode, DIR bit is set 0 in order to set a transfer from memory 31 to I/O device 36, and SIZ bit is set 00 in order to set the port size of I/O device 36 to be one byte.

When DMA transfer request signal DREQn# is made active by I/O device 36, DMA controller 20 makes bus request signal BREQ# active, and requests a bus mastership of processor 30. Once processor 30 releases the bus mastership and makes bus acknowledge signal BACK# active, DMA controller 20 begins the data-transfer between memory 31 and I/O device 36.

Figure 9:
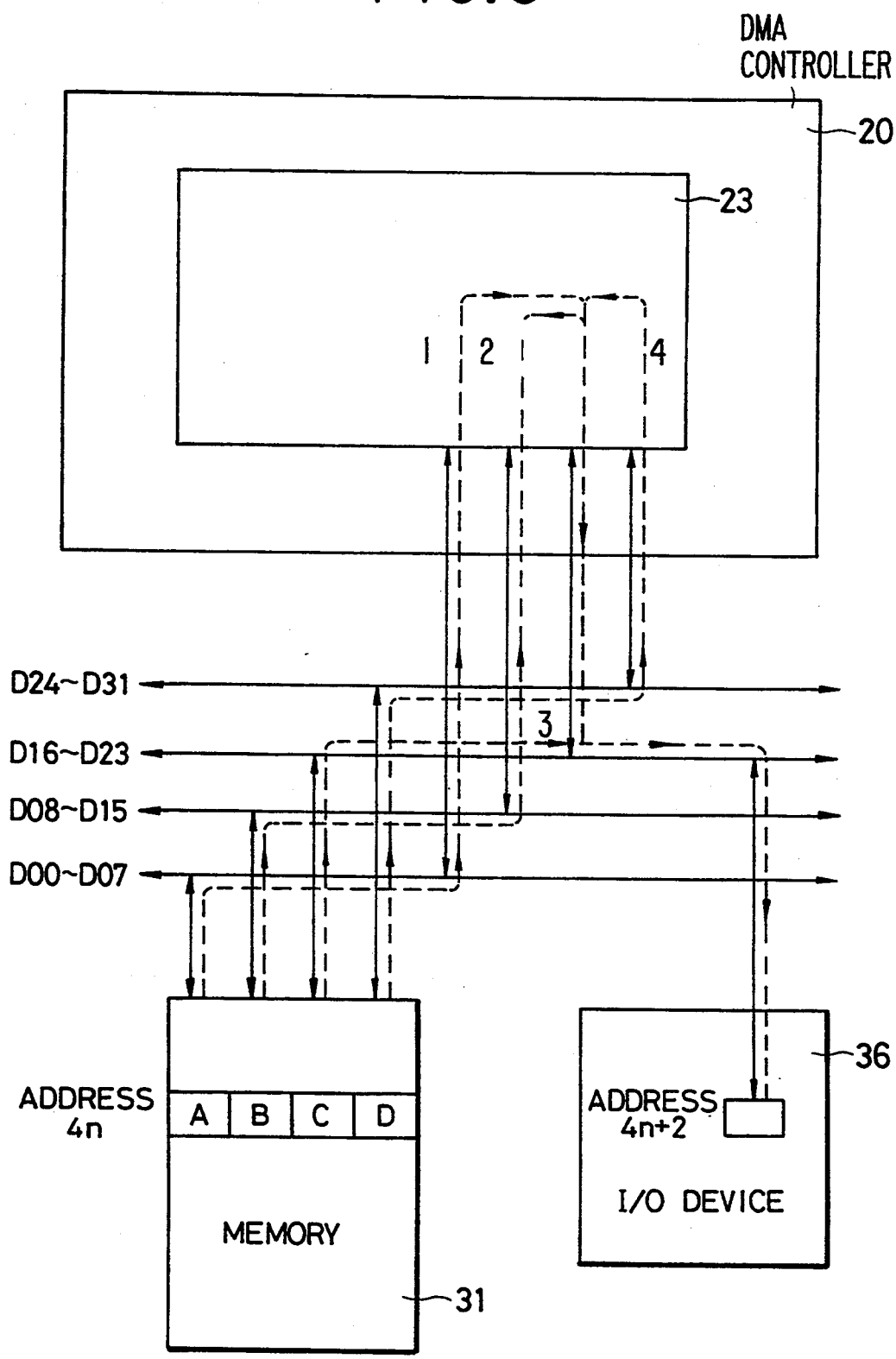
FIG. 9 is a view explaining an DMA transfer operation in the system shown in FIG. 8.

The operation of said data transfer will be explained next with referring to FIG. 9.

The first bus cycle (shown with ① in the figure) becomes a memory read having one byte size from address (4n+0). The upper 30 bits of memory address register MARn are output to address buses A00–A29, allowing byte control signals BC0#–BC3# to become 0111. In the example shown in FIG. 9, data A from memory 31 is output to data bus signals D00–D07. At this time, as bus switching signal S02 is set active in DMA controller 20, gate G02 becomes conductive so as to input data A from data bus signals D00–D07 and output them to data bus signals D16–D23 through bus switching circuit 23. Then, I/O device 36 reads data A from data bus signals D16–D23. Among the internal registers, byte count register BCRn reduces its value by one byte, which is the transferred amount. By contrast, memory address register MARn increases its value by one.

The second bus cycle (shown with ② in FIG. 9) becomes a memory read having one byte size from address (4n+1). The output of address bus signals A00–A29 stays the same as those in the first bus cycle, but the output from byte control signals BC0#–BC3# becomes 1011. In the example shown in FIG. 9, data B from memory 31 are output onto data bus signals D08–D15. In DMA controller 20, bus switching signal S1 is set active, allowing gate 12 to conduct. So, data B are input from data bus signals D08–D15, and then, output to data bus signals D16–D23 through bus switching circuit 23. Then, I/O device 36 reads data B through data bus signals D16–D23. Among the internal registers, byte count register BCRn reduces its value by one byte, which is the transferred amount. On the other hand, memory address register MARn increases its value by one.

The third bus cycle (shown with ③ in FIG. 9) becomes a memory read having one byte size beginning from address (4n+2). The outputs of address bus signals A00–A29 stay the same as those in the first bus cycle, but the output of byte control signals BC0#–BC3# becomes 1101. In the example shown in FIG. 9, data C from memory 31 are output to data bus signals D16–D23. I/O device 36 reads the outputs from data bus signals D16–D23 directly. Accordingly, in DMA controller 20, no bus switching signals become active. Among the internal registers, byte count register BCRn reduces its value by one byte, which is the transferred amount.

On the other hand, memory address register MARn increases its value by one.

The fourth bus cycle (shown by ④ in FIG. 9) becomes a memory read having one byte size beginning from address (4n+3). The outputs of address bus signals A00–A29 stay the same as those in the first bus cycle, but the outputs of byte control signals BC0#–BC3# become 1110. In the example shown in FIG. 9, data D from memory 31 are output onto data bus signals D24–D31. In DMA controller 20, bus switching signal S32 becomes active, allowing gate 32 to conduct. So, data D are input from data bus signals D24–D31 and then, output to data bus signals D16–D23 through bus switching circuit 23. Then, I/O device 36 reads data D through data bus signals D16–D23. Among the internal registers, byte count register BCRn reduces its value by one byte, which is the transferred amount. On the other hand, memory address register MARn increases its value by one.

DMA controller 20 repeats the above mentioned operations from the first to fourth bus cycle until a predetermined amount of bytes, which are set in byte count register BCRn, are transferred.

The respective signal outputs from the first to fourth bus cycle are shown in FIG. 10. In this figure, the respective codes inside parentheses mean outputs from DMA controller 20.

Figure 11:
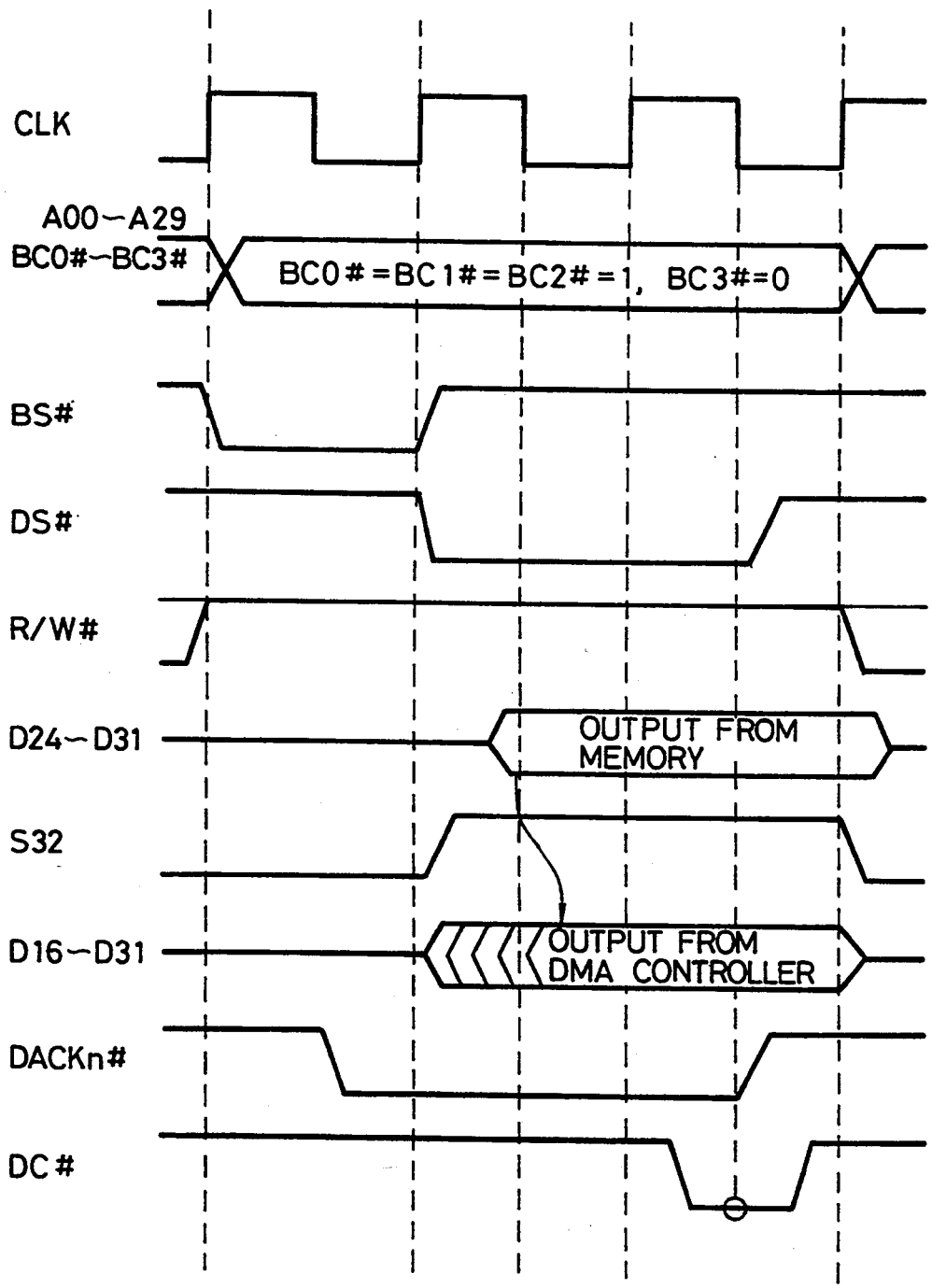
FIG. 11 is a view showing bus timings in the fourth bus cycle of the DMA transfer shown in FIG. 9.

The bus timing of the fourth bus cycle is shown in FIG. 11 by way of example. DMA controller 20 transmits the upper 30 bits, that is 4n, of the memory address into address buses A00–A29. Because the address is (4n+3), and one byte access is specified, only byte control signal BC3# is set 0 (low level). In addition, bus start signal BS# is set active for the first clock, and read-write signal R/W# is set 1 (high level) to execute a transfer from memory 31 to I/O device 36. DMA response signal DACKn# becomes active a half clock late from the beginning of the bus cycle. In the next clock, internal signal S32 in DMA controller 20 becomes active (1; high level), allowing DMA controller 20 to output data bus signals D24–D31 onto data bus signals D16–D23. The data, which have been transmitted into data bus signals D16–D23 from memory 2#34, are output into data bus signals D16–D23 through DMA controller 20. Therefore, I/O device 36 inputs these outputs according to a suitable timing. When data transfer complete signal DC# is set active from outside, DMA controller 20 makes both of DMA transfer response signal DACKn# and data strobe signal DS# inactive to complete the bus cycle. In this case, byte count register BCRn among internal registers reduces its value by one byte which corresponds to the transferred amount. On the other hand, memory address register MARn increases its value by one.

In a case where a transfer is performed from memory 31 to I/O device 36, a memory write cycle is executed. Therefore, the data bus signals D16–D23, which have been output from I/O device 36, are transmitted to a memory location from which DMA controller 20 accesses the data. The memory reads the data to complete the writing operation.

In this embodiment, 8 bit I/O device 36 is connected with data bus signals D16–D23. The device 36 may, however, be connected with data buses D00–D07, D08–D15, and D24–D31. In these cases, the respective lower 2 bites of device address registers DARn should be set 00, 01, and 11. In case of a 16 bit I/O device, it is possible to set the lower 2 bites of device address registers DARn to be 00 so as to connect with data bus signals D00–D15. Or, it is also possible to set them to be 10 so as to connect with data bus signals D16–D31. In order to decide the port size of the I/O device, any one of 00 (one byte), 01 (2 bytes), or 10 (4 bytes) can be specified into SIZ bit of operation defining registers ODRn.

Figure 12:
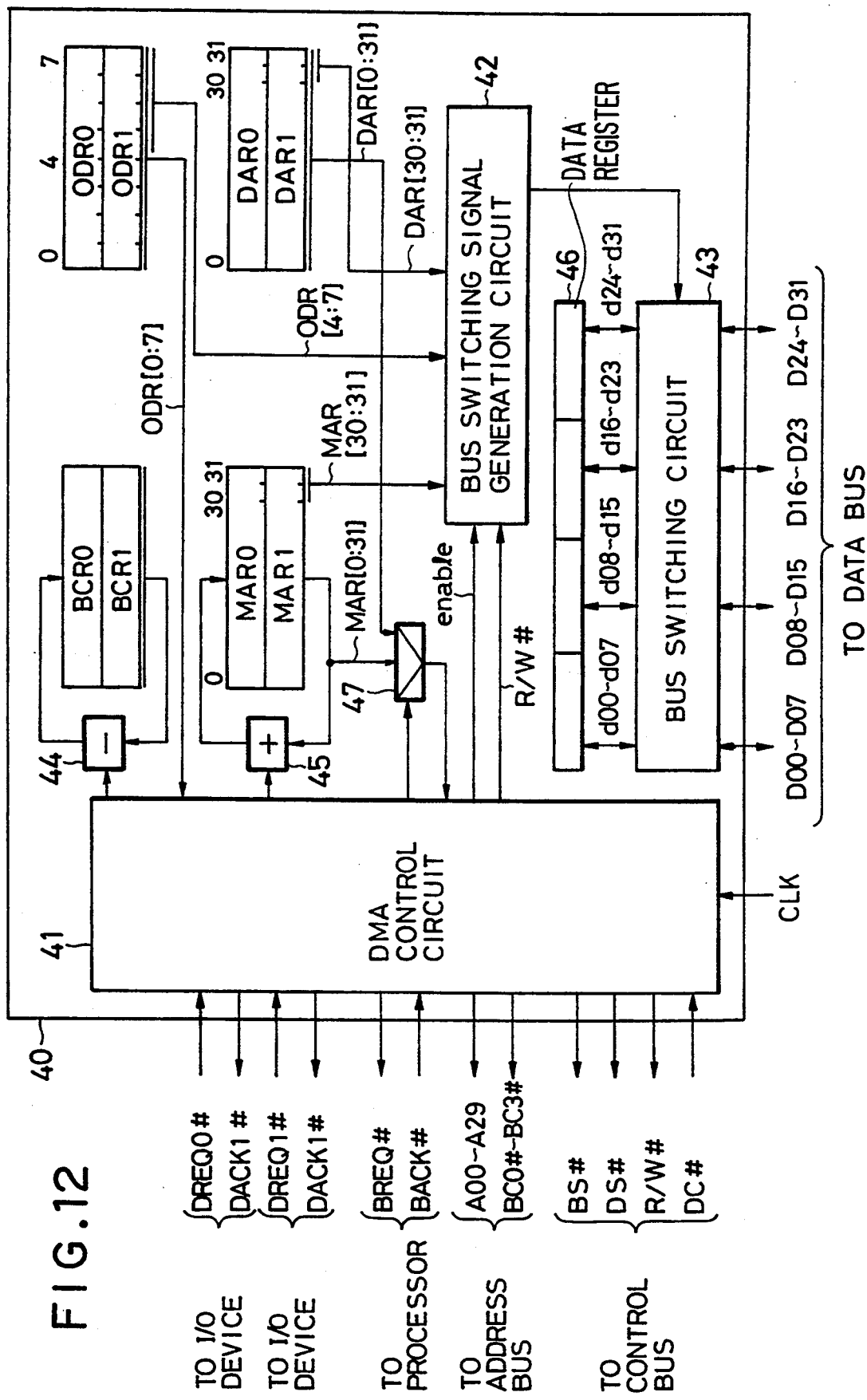
FIG. 12 is a block diagram showing the structure of a DMA controller according to the second embodiment of the present invention.

The second embodiment of the present invention will be described next. FIG. 12 shows the structure of a DMA controller according to the second embodiment of the invention. DMA controller 40 of this embodiment has a circuit structure to perform a dual address transfer. The basic structure of this controller is almost the same as that of the first embodiment.

In a dual address transfer, a memory bus cycle and an I/O bus cycle are executed. In the I/O bus cycle, an I/O address is output. Accordingly, depending on the kind of bus cycles, selecter 47 controls to input either one of the outputs of memory address register MARn or device address register DARn into DMA control circuit 41.

In the dual address transfer, values in memory address register MARn and byte count register BCRn are updated by the size of the I/O device, when the device is accessed.

In the dual address transfer, the data transfer between the memory and the I/O device is carried out through internal data register 46. This transfer is executed with 4 byte size, because data register 46 has 4 bytes size. Data register 46 is capable of reading and writing data with one-byte size, two byte size or four-byte size. In a case to execute a DMA data transfer in a dual address transfer mode from a memory to an I/O device having one byte port size, the data are once read out from the memory with 4 byte size, and then, these are input to data register 46. The content in register 46 is then written into the I/O device by one byte size. As a result, the writing is executed four times.

Data register 46 is connected with bus switching circuit 43 through internal data bus signals d00–d31. In one byte of data register 46, which is connected with internal data bus signals d00–d07, the data held in memory address (4n+0) are stored. In the same manner, the data held in memory address (4n+1) are stored in another byte connected with internal data bus signals d08–d15; the data held in memory address (4n+2) are stored in the other byte connected with internal data bus signals d16–d23; and the data held in memory address (4n+3) are stored in the last byte connected with internal data register d24–d31, respectively.

Figure 13:
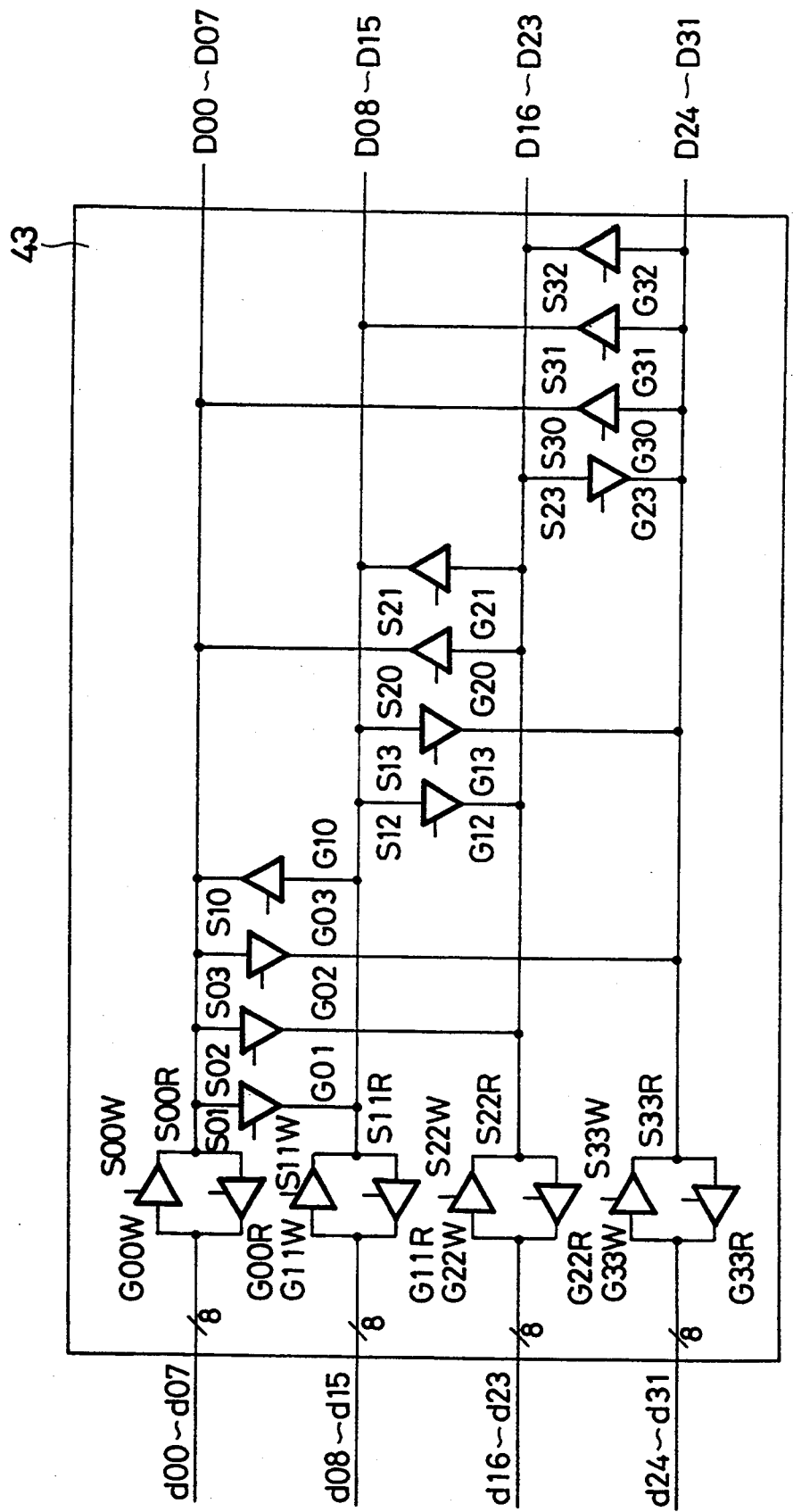
FIG. 13 is a schematic diagram showing the detailed structure of a bus switching circuit according to the second embodiment of the present invention.

In a dual address transfer mode, bus switching circuit 43 executes switchings of internal data bus signals d00–d31 and external data bus signals D00–D31, according to the outputs of bus switching signal generation circuit 42. On the other hand, circuit 43 only executes switchings among external data bus signals D00–D31 in a single address transfer mode. In FIG. 13, the details of bus switching circuit 43 is shown. In addition to bus switching circuit 23 in DMA controller 20 according to the first embodiment, this circuit 43 is comprised of gates G00R, G00W, G11R, G11w, G22R, G22W, G33R, and G33W. These gates are provided in order to connect external data bus signals D00–D31 with internal data bus signals d00–d31 under the control of bus switching signals S00R, S00W, S11R, S11W, S22R, S22W, S33R, and S33W. These signals are output from bus switching signal generation circuit 42.

Figure 14:
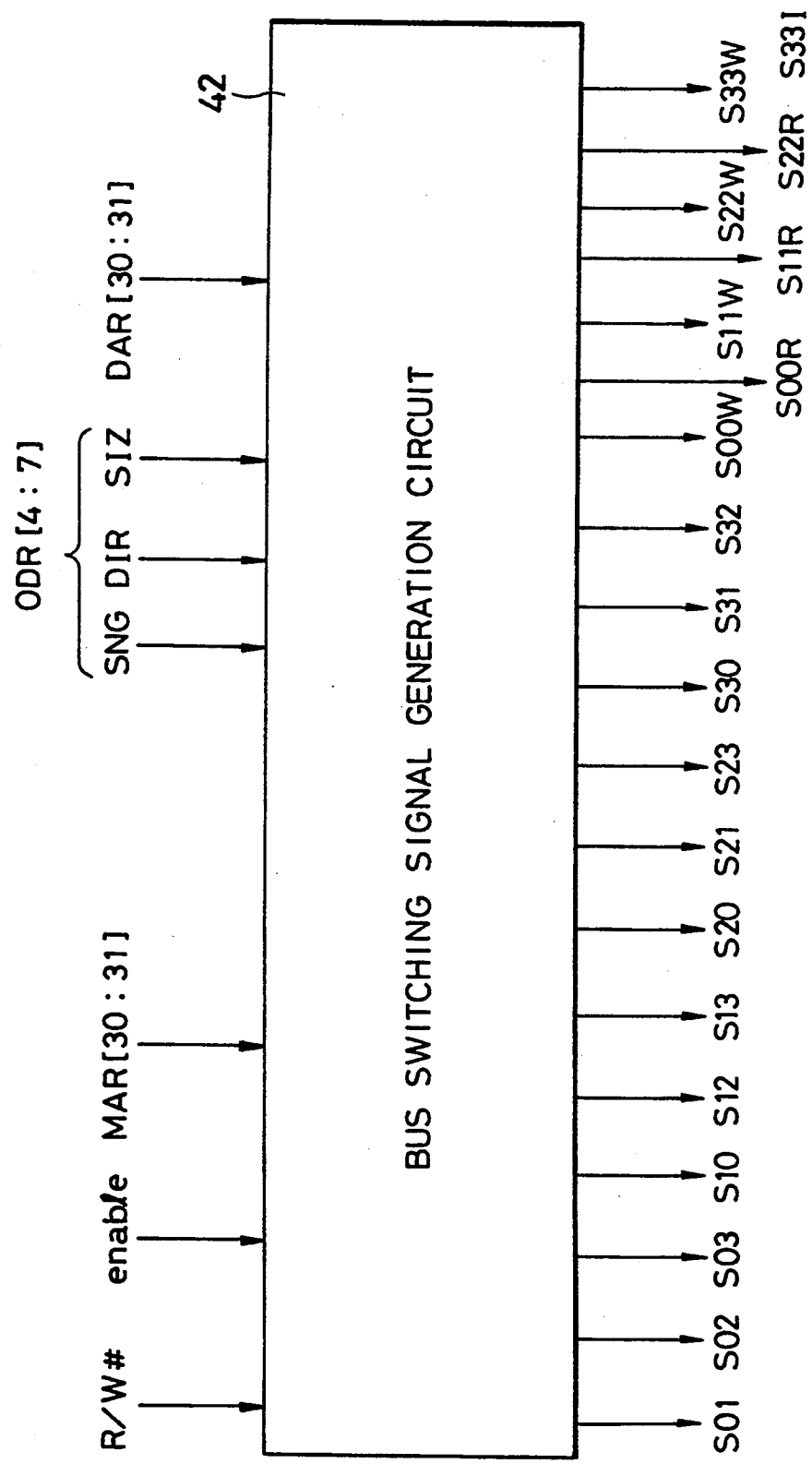
FIG. 14 is a view explaining the interface signals for a bus switching signal generation circuit according to the second embodiment of the present invention.

Bus switching signal generation circuit 42 produces bus switching signals SXX, SXXR, and SXXW for the gates in bus switching circuit 43. The interface signals for bus switching signal generation circuit 42 are shown in FIG. 14. SNG bit is also input to this circuit 43 in order to control dual address transfers. A memory bus cycle and an I/O bus cycle are performed during a dual address transfer, so read-write signal R/W# besides DIR bit are also input to circuit 42. The output operation of the bus switching signals in a single address mode is almost the same as that of bus switching signal generation circuit 22 in DMA controller 20 according to the first embodiment.

The operation in a dual address mode is summarized in FIGS. 15a, 15b, 16a, 16b, 17a, and 17b.

FIG. 15a shows bus switching signals which become active in the following conditions: in a dual address transfer (SNG=0); in a transfer from a memory to an I/O device (DIR=0); when the port size of the I/O device is one byte (SIZ=00); and in an I/O write bus cycle (R/W#=0). On the other hand, FIG. 15b shows bus switching signals which become active in the following conditions: in a dual address transfer (SNG=0); in a transfer from an I/O device to a memory (DIR=1); when the port size of the I/O device is one byte (SIZ=00); and in an I/O read bus cycle (R/W#=1).

Similarly, FIG. 16a shows bus switching signals which become active in the following conditions: in a dual address transfer (SNG=0); in a transfer from a memory to an I/O device (DIR=0); when the port size of the I/O device is two bytes (SIZ=01); and in an I/O write bus cycle (R/W#=0). FIG. 16b shows bus switching signals which become active in the following conditions: in a dual address transfer (SNG=0); in a transfer from an I/O device to a memory (DIR=1); when the port size of the I/O device is two bytes (SIZ=01); and in an I/O read bus cycle (R/W#=1).

Further, FIG. 17a shows bus switching signals which become active in the following conditions: in a dual address transfer (SNG=0); in a transfer from a memory to an I/O device (DIR=0); when the port size of the I/O device is four bytes (SIZ=10); and in an I/O write bus cycle (R/W#=0). FIG. 17b shows bus switching signals which become active in the following conditions: in a dual address transfer (SNG=0); in a transfer from an I/O device to a memory (DIR=1); when the port size of the I/O device is four bytes (SIZ=10); and in an I/O read bus cycle (R/W#=1).

A concrete example is shown in FIG. 18. In this figure, a transfer operation from memory address (4n+0) to the I/O device, which is in address (4m+2), is illustrated. I/O device 15 is connected with external data bus signals D16-D23. Among internal registers in DMA controller 15, memory address register DARn is set (4n+0) and device address register DARn is set (4m+2). In operation defining register ODRn, EX bit is set 1 (operation start); SNG bit is set 0 (dual address transfer); DIR bit is set 0 (a transfer from the memory to the I/O device); and SIZ bit is set 00 (the port size of the I/O device is one byte).

In the situation mentioned above, the first bus cycle becomes a memory read cycle of 4 byte size which begins from address (4n+0). At this time, the upper 30 bits in memory address register MARn are output to address buses A00-A29. As a result, byte control signals BC0#-BC3# become 0000. In DMA controller 40, bus switching signals S00R, S11R, S22R, and S33R become active, allowing gates G00R, G11R, G22R, and G33R to conduct. As a result, external data bus signals D00-D31 are output to internal data bus signals d00-d31. In concrete, data A, B, and C, which are output to external data bus signals D00-D31 from memory 50, are stored into data register 46 through internal data bus signals d00-d31.

The second bus cycle becomes an I/O write cycle of one byte size for I/O device 51. The output from address buses A00-A29 is 4m, and byte control signals BC0#-BC3# become 1101. In the example shown in FIG. 18, data A, which are held in data register 46 of DMA controller 40, are output onto data bus signals d00-d07. Bus switching signals S00W and S02 become active to allow gates G00W and G02 to conduct. As a result, data A are output to external data bus signals D16-D23 through bus switching circuit 43. I/O device 51 reads data A through external data bus signals D16-D23. Among various internal registers, byte count register BCRn reduces its value by one byte which is the transferred amount. By contrast, memory address register MARn increases its value by one.

In the same manner as the second bus cycle, the third, fourth, and fifth bus cycles become I/O write cycles for I/O device 51, each of which has one byte size. Bus switching signals are produced in bus switching signal generation circuit 42 so as to transmit data B, C, and D into external data bus signals D16-D23 from data register 46 in DMA controller 40. According to the control by those bus switching signals, the outputs from data register 46 are supplied into external data bus signals D16-D23 through bus switching circuit 43.

DMA controller 40 repeats the above mentioned operation which begins from the first bus cycle and completes at the fifth bus cycle, until a predetermined amount of bytes, which is set in byte count register BCRn, are completely transferred. Respective output signals from the first to fifth bus cycles are summarized in the table shown in FIG. 19.

On the other hand, in the single address transfer mode described in the second embodiment, bus switching signals are so produced in bus switching signal generation circuit 42 that bus signals become active in the same conditions as those of the first embodiment. As described above, the DMA controller of the second embodiment has two functions, that is, a dual address transfer and a single address transfer. Accordingly, bus switching signal generation circuit 42 and bus switching circuit 43 are used to connect the output of the data register in DMA controller 40 with external data bus signals D00-D31 in a dual address transfer mode, as well as to execute switchings among external data bus signals D00-D31 in a single address transfer mode.

A switching circuit and its control circuit for exchanging data between internal and external data bus signals, and the data register, which are all provided in a prior art DMA controller and used for a dual address transfer, can be used to construct the device of this embodiment. Therefore, the device of this embodiment can reduce its circuit area as compared with the prior device which has an external bus switching circuit.

Next, the third embodiment of this invention will be explained. This embodiment is a variant of the first and second embodiments of the present invention. So, the circuit of this embodiment is characterized by the fact that it has a function to control a bus switching circuit in both directions. The basic structure of this circuit is, therefore, almost the same as DMA controller 20 or 40 in the first or the second embodiment. Then, the variant of the first embodiment will be explained below.

Figure 20:
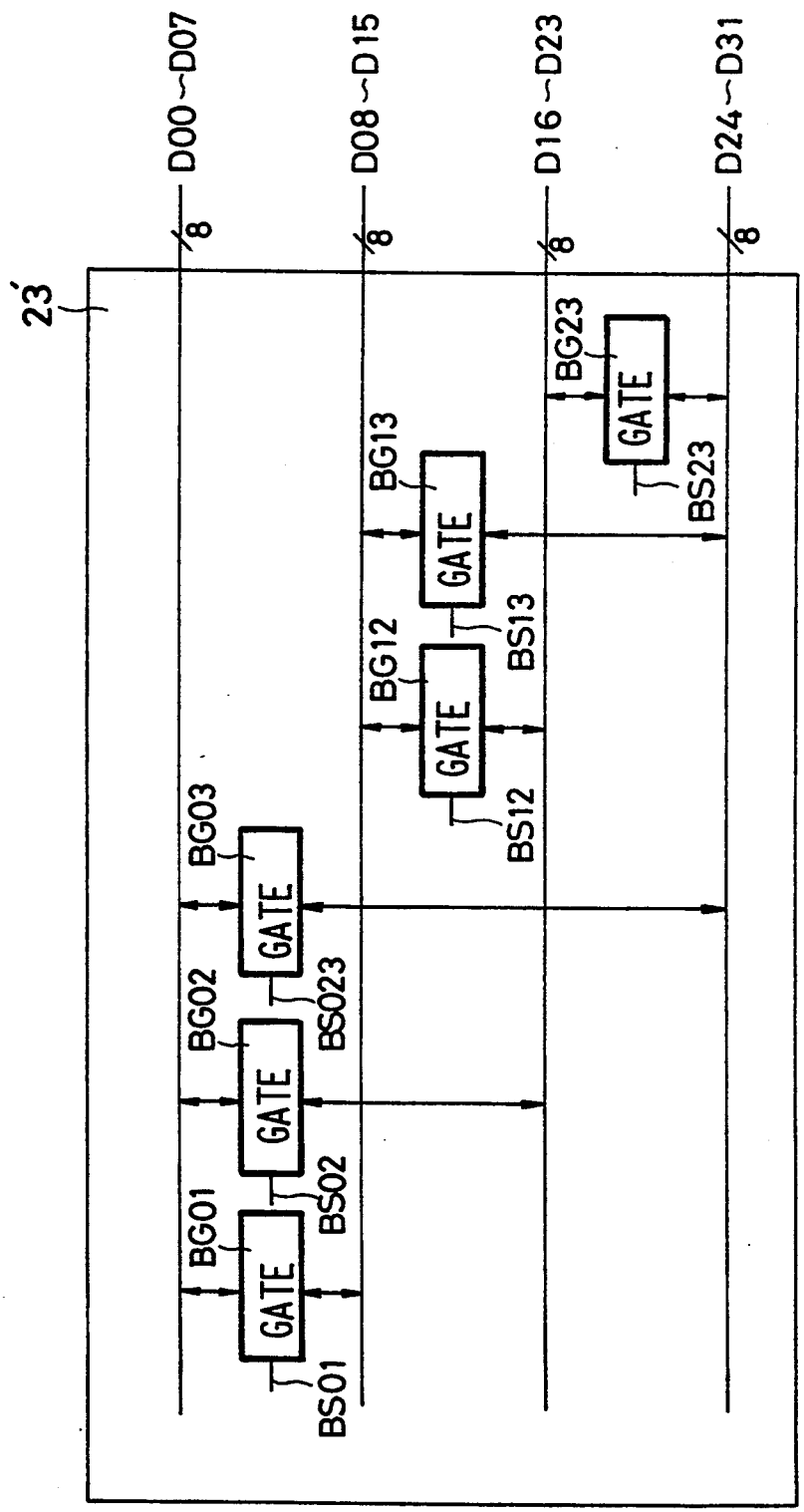
FIG. 20 is a schematic diagram showing the detailed structure of a bus switching circuit according to the third embodiment of the present invention.

Bus switching circuit 23' performs switchings among data bus signals D00-D31 according to the signals from bus switching signal generation circuit 22'. The detailed structure of bus switching circuit 23' is shown in FIG. 20. Gate BG01 makes electrical connections between data bus signals D00-D07 and data bus signals D08-D15. When bus switching signal BS01 from bus switching signal generation circuit 22' is active, gate BG01 becomes active, allowing data bus signals D00-D07 and data bus signals D08-D15 to be the same electrical level. In the example shown in FIG. 20, Gate BG01 is considered not to have directional quantities for inputs and outputs. In the similar manner as that of mentioned above, gate BG02 connects data bus signals D00-D07 with data bus signals D16-D23; gate BG03 connects data bus signals D00-D07 with data bus signals D24-D31; gate BG12 connects data bus signals D08-D15 with data bus signals D16-D23; gate BG13 connects data bus signals D08-D15 with data bus signals D24-D31; gate BG23 connects data bus signals D16-D23 with data bus signals D24-D31. Bus switching signals BS02, BS03, BS12, BS13, and BS23 make these gates conductive.

Figure 21:
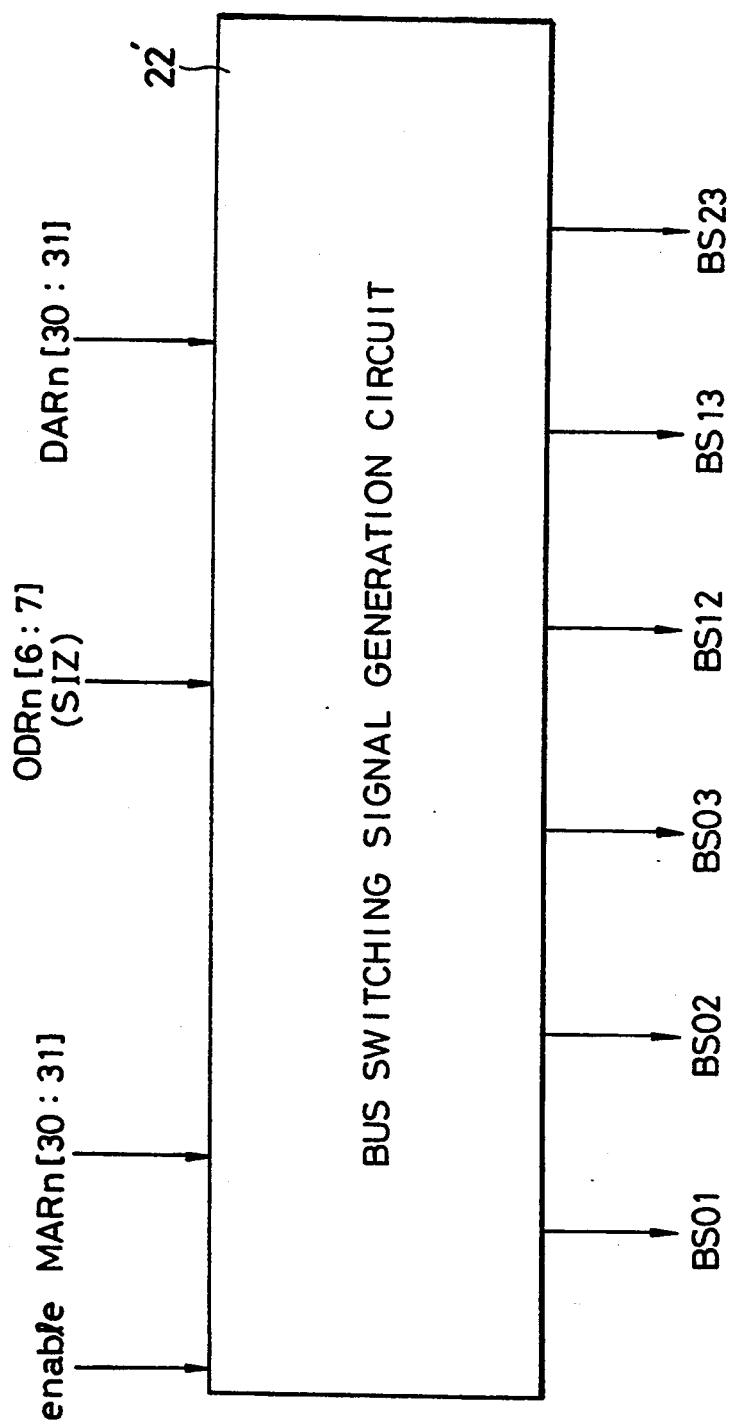
FIG. 21 is a view showing the interface signals for the bus switching signal generation circuit according to the third embodiment of the present invention.
Figure 24:
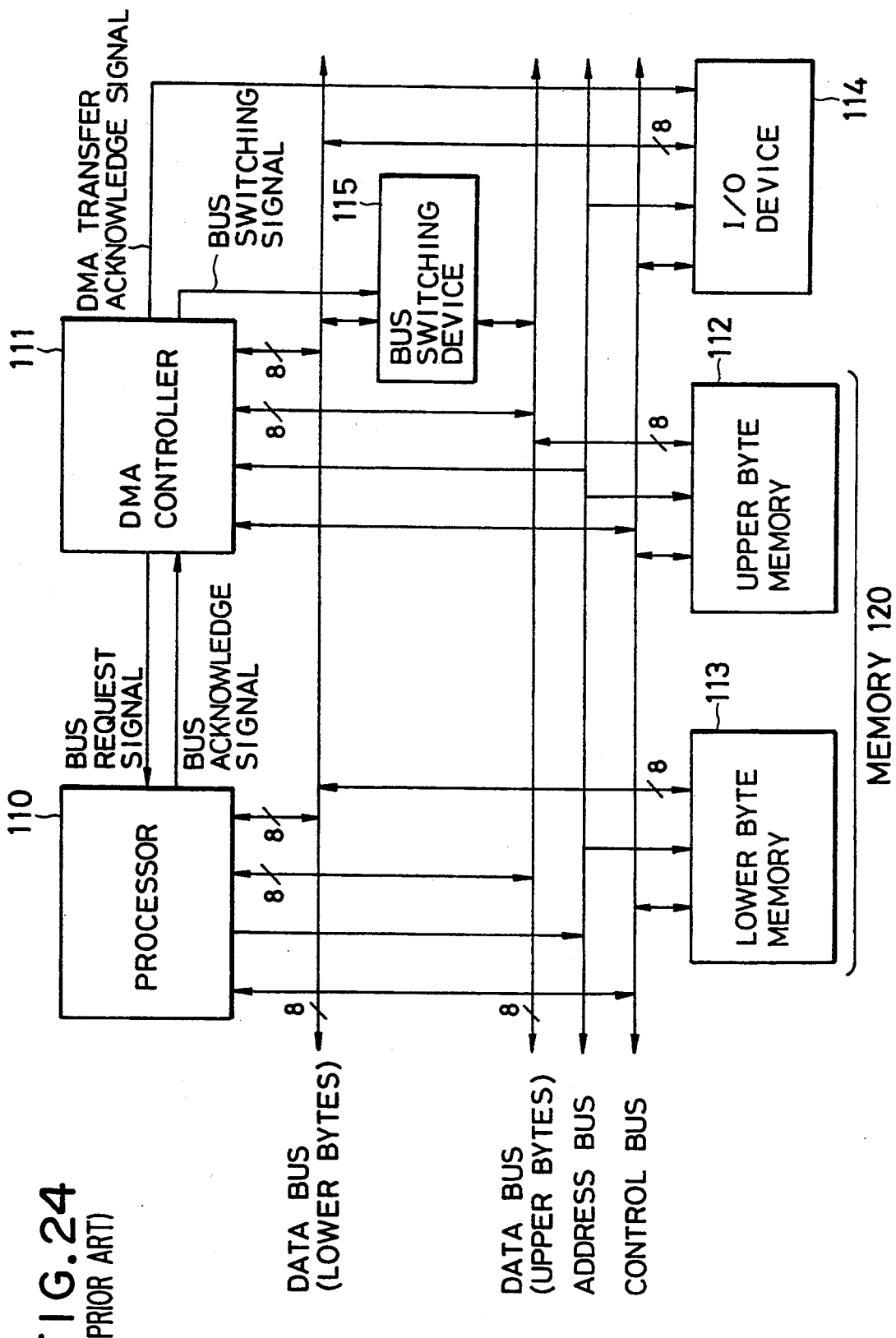
FIG. 24 is a block diagram showing the structure of a micro-processor system having a DMA controller according to the prior art of the present invention.

Bus switching signal generation circuit 22' produces bus switching signals BSXX to control the gates in bus switching circuit 23'. The interface signals for bus switching signal generation circuit 22' are shown in FIG. 21. An enable signal from DMA control circuit 21, the lower 2 bites, MAR [30 : 31], in memory address register MARn, SIZ bit in operation defining register ODRn, and the lower 2 bites, DAR [30 : 31], of device address register DARn are input to circuit 22'. According to these inputs, circuit 22' outputs bus switching signals BSXX to control gates in bus switching circuit 23'. In FIGS. 22a and 22b, conditions to output said switching signals BSXX are listed. Concretely, FIG. 22a shows bus switching signals BSXX which are made active when SIZ bit is 00, that is, the port size of the I/O device is one byte. For example, bus switching signal BS12 becomes active when DAR [30 : 31] is 01 and MAR [30 : 31] is 10.

Similarly, FIG. 22b shows bus switching signals BSXX which are made active when SIZ bit is 01, that is, the port size of the I/O device is 2 bytes. These output signals become active when said enable signal is set active (1; high level). When SIZ bit is set 10, that is, the port size of the I/O device is 4 bytes, no output is set active.

Bus switching signal generation circuit 22' is comprised of AND, OR, NOT gates and so on, which are combined with each other so as to realize the above mentioned logic. One concrete example of bus switching signal generation circuit 22' is shown in FIG. 23. Other than the logic elements mentioned above, PLA, ROM, and so on can be used to realize said logic.

In summary, as mentioned above, the DMA controller of this invention carries out bus switchings by itself in order to execute a data transfer between a memory and an I/O device. Accordingly, this invention need not to have external bus switching means and bus switching signals from a DMA controller, which have been required in prior art devices. So, a DMA controller, which allows to simplify the construction of a micro-processor system, can be obtained according to the present invention.

In addition, the connection point of an I/O device can be set by the first and second address means, and the port size of the I/O device can be set by size indicating means, according to the present invention. As a result, unlike the prior art device, the connection of the I/O device is not restricted in this invention. The DMA controller of the present invention, therefore, enables to construct a micro-processor system more flexibly.

Various modifications will become possible for those skilled in the art after receiving the teachings of the present disclosure without departing from the scope thereof.

What is claimed is:

1. A DMA controller for controlling DMA transfers on a data bus where said data bus is comprised of a plural-byte of data bus signals, the DMA controller comprising:
   first address means for indicating a position of a data bus signals in byte unit;
   size indicating means for specifying the size of an access;
   bus switching signal generation means for producing but switching signals which indicate to connect the data bus signals from the position of the data bus signals in byte unit indicated by said first address means to the position of the data bus signals in byte unit indicated by said size indicating means with some of the other plural bytes of data bus signals;
   bus switching means for connecting the data bus signals with the other data bus signals according to said bus switching signals; and
   wherein said data bus comprises signals lines comprising a plurality of bytes and said bus switching means is capable of transferring data on any byte position of said data bus to any other byte position of said data bus.

2. A DMA controller for controlling DMA transfers on a data bus comprised of a plural-byte of the data bus signals, the DMA controller comprising:
   first address means for indicating a position of a data bus signals in byte unit;
   size indicating means for specifying the size of an access;
   bus switching signal regeneration means for producing bus switching signals which indicate to connect the data bus signals from the position of the data bus signals in byte unit indicated by said first address means to the position of the data bus signals in byte unit indicated by said size indicating means with the data bus signals from the position of the data of the data bus signals in byte unit indicated by a second address means to the position of the data bus signals in byte unit indicated by said size indicating means;
   bus switching means for connecting the data bus signals with some of the other plural bytes of data bus signals; according to said bus switching signals; and
   wherein said data bus comprises signals lines comprising a plurality of bytes and said bus switching means is capable of transferring data on any byte position of said data bus to any other byte position of said data bus.

3. A DMA controller for controlling DMA transfers on a data bus that comprises a plural byte of data bus signals, the DMA controller comprising:
   first address means for indicating a position of a data bus signals in byte unit;
   size indicating means for specifying the size of an access;
   direction indicating means for specifying whether the content of said first address means is a source address or a destination address of a transfer;
   bus switching signal generation means for producing bus switching signals which indicate to connect the data bus signals from the position of the data bus signals in byte unit indicated by said first address means to the position of the data bus signals in byte unit indicated by said size indicating means with some of the other plural bytes of data bus signals; when the content of said first address means is the source address, and for producing bus switching signals which indicate to connect an data bus signals with the data bus signals from the position of the data bus signals in byte unit indicated by said first address means to the position of the data bus signals in byte unit indicated by said size indicating means when the content of said first address means is the destination address of a transfer;
   bus switching means for connecting the data bus signals with the some of the data bus signals according to said bus switching signals; and
   wherein said data bus comprises signals lines comprising a plurality of bytes and said bus switching means is capable of transferring data on any byte position of said data bus to any other byte position of said data bus.

4. The DMA controller for controlling DMA transfers on a data bus comprised of a plural-byte of data bus signals, the DMA controller comprising:

first address means for indicating a position of a data bus signals in byte unit;

second address means for indicating the position of the data bus signals in byte unit, independent of said first address means;

size indicating means for specifying the size of an access;

direction indicating means for specifying whether the content of said first address means is a source address or a destination address of a transfer;

bus switching signal generation means for producing bus switching signals which indicate to connect the data bus signals from the position of the data bus signals in byte unit indicated by said first address means to the position of the data bus signals in byte unit indicated by said size indicating means with the data bus signals from the position of the data bus signals in byte unit indicated by said second address means to the position of the data bus signals in byte unit indicated by said size indicating means when the content of said first address means is the source address, and for producing bus switching signals which indicate to connect the data bus signals from the position of the data bus signals in byte unit indicated by said second address means to the position of the data bus signals in byte unit indicated by said size indicating means with the data bus signals from the position of the data bus signals in byte unit indicated by said first address means to the position of the data bus signals in byte unit indicated by said size indicating means when the content of said first address means is the destination address of a transfer;

bus switching means for connecting the data bus signals with some of the other plural bytes of data bus signals; according to said bus switching signals; and wherein said data bus comprises signals lines comprising a plurality of bytes and said bus switching means is capable of transferring data on any byte position of said data bus to any other byte position of said data bus.

5. A DMA controller for controlling DMA transfers on a data bus comprised of a plural-byte of data bus signals, the DMA controller comprising:

a DMA control circuit connected with external I/O devices and an external processor by a data bus, an address bus, a control bus and control signals;

a plurality of internal registers;

an adder for increasing a value of a particular internal register by one according to the control by said DMA control circuit;

a subtracter for decreasing a value of another particular internal register by one according to the control by said DMA control circuit;

a bus switching signal generation circuit for producing bus switching signals from the values in said internal registers according to the control by said DMA control circuit;

a bus switching circuit in order to execute switchings among said data bus signals according to said bus switching signals from said bus switching signal generation circuit; and wherein said data bus comprises signals lines comprising a plurality of bytes and said bus switching circuit is capable of transferring data on any byte position of said data bus to any other byte position of said data bus.

6. The DMA controller as claimed in claim 5, wherein said DMA control circuit is connected with external I/O devices through DMA transfer request signals and DMA transfer acknowledge signals as well as being connected with an external processor through a bus request signal and a bus acknowledge signal.

7. The DMA controller as claimed in claim 5, wherein said internal registers include a memory address register, a device address register, an operation defining register, and byte count register.

8. The DMA controller as claimed in claim 7, wherein said operation defining register has an EX bit to indicate whether a particular channel is under operation or not, a SNG bit to indicate a single address mode or a dual address mode, a DIR bit to indicate the direction of a transfer between an I/O device and a memory, and a SIZ bit to indicate the size of the I/O device.

9. The DMA controller as claimed in claim 7, wherein said subtracter is connected with said byte count register.

10. The DMA controller as claimed in claim 7, wherein said adder is connected with said memory address register.

11. The DMA controller as claimed in claim 5, wherein said bus switching circuit is comprised of a plurality of gates.

12. A DMA controller for controlling DMA transfers on a data bus comprised of a plural-byte of data bus signals, the DMA controller comprising:

a DMA control circuit connected with external I/O device and an external processor by a data bus, an address bus, a control bus and control signals, an operation defining register for holding information regarding the operation of a DMA transfer;

a memory address register for storing a memory address which is accessed in a DMA transfer;

a device address register for storing a device address which is accessed in a DMA transfer;

a byte count register for indicating byte numbers of data to be transferred;

an adder for increasing a value of said memory address register under the control by said DMA control circuit;

a subtracter for decreasing a value of said byte count register under the control by said DMA control circuit;

a bus switching signal generation circuit for producing bus switching signals according to values in said memory address register, operation defining register, and device address register;

a bus switching circuit in order to execute switchings among data bus signals according to said bus switching signals from said bus switching signal generation circuit;

an internal data register connected with said bus switching circuit through internal data buses;

a selector for selectively inputting either a value from said memory adders register or a value from said device address register into said DMA control circuit; and wherein said data bus comprises signals lines comprising a plurality of bytes and said bus switching circuit is capable of transferring data on any byte position of said data bus to any other byte position of said data bus.

13. The DMA controller as claimed in claim 12, wherein said DMA control circuit is connected with external I/O devices through DMA transfer request signals and DMA transfer acknowledge signals as well as being connected with an external processor through a bus request signal and a bus acknowledge signal.

14. The DMA controller as claimed in claim 12, wherein said operation defining register has an EX bit to indicate whether a particular channel is under operation or not, a SNG bit to indicate a single address mode or a dual address mode, a DIR bit to indicate the direction of a transfer between an I/O device and a memory, and a SIZ bit to indicate the size of the I/O device.

15. The DMA controller as claimed in claim 12, wherein said bus switching circuit executes not only signal switchings between internal and external data bus signals in a dual address transfer mode but signal switchings among external data bus signals in a single address transfer mode.

16. The DMA controller as claimed in claim 12, wherein said bus switching circuit is comprised of a plurality of gates.

17. A DMA controller for controlling DMA transfer between a memory and an I/O device through a data bus comprising:
- a DMA controlling circuit for exchanging necessary control signals with said I/O device, a processor and a memory for carrying out DMA transfer;
- a memory address register for storing addresses of said memory to be accessed;
- a device address register for holding an address of said I/O device; and
- a bus switching circuit for transferring data on part of said data bus to different part of said data bus to which said I/O device is connected,
- wherein said data bus comprises signals lines comprising a plurality of bytes and said switching circuit is capable of transferring data on any byte position of said data bus to any other byte position of said data bus.

18. The DMA controller as claimed in claim 17, wherein said data bus comprises signal lines of 4 bytes.

* * * * *